US012470274B2

(12) United States Patent
Raghavan

(10) Patent No.: US 12,470,274 B2
(45) Date of Patent: Nov. 11, 2025

(54) TECHNIQUES FOR SPEEDY DETERMINATION OF ADAPTIVE BEAM WEIGHTS

(71) Applicant: QUALCOMM Incorporated, San Diego, CA (US)

(72) Inventor: Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 18/494,498

(22) Filed: Oct. 25, 2023

(65) Prior Publication Data

US 2025/0141523 A1  May 1, 2025

(51) Int. Cl.
*H04L 5/12*  (2006.01)
*H04B 7/0456*  (2017.01)
*H04B 7/06*  (2006.01)

(52) U.S. Cl.
CPC ......... *H04B 7/0639* (2013.01); *H04B 7/0456* (2013.01); *H04B 7/0634* (2013.01)

(58) Field of Classification Search
CPC ... H04B 7/0639; H04B 7/0456; H04B 7/0634
USPC ....................................................... 375/262
See application file for complete search history.

(56) References Cited

U.S. PATENT DOCUMENTS

| | | | | |
|---|---|---|---|---|
| 7,286,855 B2 * | 10/2007 | Raleigh | .................. | H01Q 3/267 455/562.1 |
| 2015/0023260 A1 * | 1/2015 | Chiu | .................... | H04B 7/0456 375/267 |
| 2018/0262253 A1 * | 9/2018 | Rahman | ................ | H04B 7/0626 |
| 2021/0036893 A1 * | 2/2021 | Visotsky | ............. | H04L 25/0202 |
| 2021/0234600 A1 * | 7/2021 | Vieira | .................... | H04W 16/28 |
| 2022/0021493 A1 * | 1/2022 | Raghavan | ............ | H04B 7/0695 |
| 2022/0210799 A1 * | 6/2022 | Zhu | ........................ | H04B 7/0695 |
| 2023/0292154 A1 | 9/2023 | Burghal et al. | | |
| 2023/0308162 A1 | 9/2023 | Raghavan et al. | | |
| 2023/0353203 A1 * | 11/2023 | Burghal | ............... | H04B 7/0634 |

OTHER PUBLICATIONS

International Search Report and Written Opinion—PCT/US2024/048365—ISA/EPO—Dec. 17, 2024 (2303684WO).

* cited by examiner

*Primary Examiner* — Helene E Tayong
(74) *Attorney, Agent, or Firm* — Dalei Dong; Holland & Hart LLP

(57) ABSTRACT

Techniques for wireless communication are described. A device may generate a channel covariance matrix using a quantity of beams that is less than a quantity of elements of the channel covariance matrix. The device may utilize a scheme for selecting a subset of beams for generating the channel covariance matrix. The device may generate one or more diagonal elements of the channel covariance matrix based on measurements of a first number of beams of the subset. The device may generate other elements of the channel covariance matrix based on measurements of a second number of beams of the subset. The device may also approximate one or more remaining elements of the channel covariance matrix based on the generated elements. The device may determine a set of beams for selecting the subset of beams, and may communicate beamformed signaling via a beam that is based on the generated channel covariance matrix.

26 Claims, 12 Drawing Sheets

TECHNIQUES FOR SPEEDY DETERMINATION OF ADAPTIVE BEAM WEIGHTS

FIELD OF DISCLOSURE

The present disclosure, for example, relates to wireless communication systems, more specifically to techniques for a speedy determination of adaptive beam weights to be used for communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for speedy determination of adaptive beam weights. For example, the described techniques may provide a framework for a communication device to select a subset of measurement beams from a set of measurement beams. The communication device may use the selected subset of measurement beams to generate a channel covariance matrix associated with beamformed communications at the communication device. A quantity of measurement beams of the subset of measurement beams may be less than a quantity of elements or size (e.g., entries, values) of the channel covariance matrix, which may lead to a reduced processing time associated with generating the channel covariance matrix. For example, the communication device may determine a subset of elements of a channel covariance matrix based on signal strength or phase measurements associated with the selected subset of measurement beams and may determine remaining elements of the channel covariance matrix based on one or more approximations using the determined subset of elements. The communication device may perform the beamformed communication via a set of estimated beam weights that are based on the channel covariance matrix. The communication device may determine the set of beams autonomously or based on signaling (e.g., control signaling) received from another communication device (e.g., another UE, a network entity).

A method for wireless communication by a device is described. The method may include selecting a subset of measurement beams from a set of measurement beams for beamformed communication, determining a subset of elements of a channel covariance matrix based on signal strength or phase measurements associated with the selected subset of measurement beams, where a number of measurement beams of the selected subset of measurement beams is less than a number of elements of the channel covariance matrix, determining remaining elements of the channel covariance matrix based on one or more approximations using the determined subset of elements of the channel covariance matrix, and performing the beamformed communication via a set of estimated beam weights for communication, where the set of estimated beam weights is based on the channel covariance matrix.

A device for wireless communication is described. The device may include one or more memories storing processor executable code, and one or more processors coupled with the one or more memories. The one or more processors may individually or collectively operable to execute the code to cause the device to select a subset of measurement beams from a set of measurement beams for beamformed communication, determine a subset of elements of a channel covariance matrix based on signal strength or phase measurements associated with the selected subset of measurement beams, where a number of measurement beams of the selected subset of measurement beams is less than a number of elements of the channel covariance matrix, determine remaining elements of the channel covariance matrix based on one or more approximations using the determined subset of elements of the channel covariance matrix, and perform the beamformed communication via a set of estimated beam weights for communication, where the set of estimated beam weights is based on the channel covariance matrix.

Another device for wireless communication is described. The device may include means for selecting a subset of measurement beams from a set of measurement beams for beamformed communication, means for determining a subset of elements of a channel covariance matrix based on signal strength or phase measurements associated with the selected subset of measurement beams, where a number of measurement beams of the selected subset of measurement beams is less than a number of elements of the channel covariance matrix, means for determining remaining elements of the channel covariance matrix based on one or more approximations using the determined subset of elements of the channel covariance matrix, and means for performing the beamformed communication via a set of estimated beam weights for communication, where the set of estimated beam weights is based on the channel covariance matrix.

A non-transitory computer-readable medium storing code for wireless communication is described. The code may include instructions executable by a processor to select a subset of measurement beams from a set of measurement beams for beamformed communication, determine a subset of elements of a channel covariance matrix based on signal strength or phase measurements associated with the selected subset of measurement beams, where a number of measurement beams of the selected subset of measurement beams is less than a number of elements of the channel covariance matrix, determine remaining elements of the channel covariance matrix based on one or more approximations using the determined subset of elements of the channel covariance matrix, and perform the beamformed communication via a set of estimated beam weights for communication, where the set of estimated beam weights is based on the channel covariance matrix.

In some examples of the method, devices, and non-transitory computer-readable medium described herein, determining the subset of elements of the channel covariance matrix may include operations, features, means, or instructions for determining each element of a first number of elements of the subset of elements based on respective channel measurements associated with a first number of measurement beams of the selected subset of measurement beams, where each element of the first number of elements may be positioned along a primary diagonal of the channel covariance matrix and determining each element of a second number of elements of the subset of elements based on respective channel measurements associated with a second number of measurement beams of the selected subset of measurement beams, where a first one or more elements of the second number of elements may be positioned along the same row as an element of the first number of elements, and where a second one or more elements of the second number of elements may be positioned along the same column as the element.

Some examples of the method, devices, and non-transitory computer-readable medium described herein may further include operations, features, means, or instructions for selecting the element based on the element having a highest associated signal strength in measurements among the first number of elements.

In some examples of the method, devices, and non-transitory computer-readable medium described herein, determining the subset of elements of the channel covariance matrix may include operations, features, means, or instructions for determining each element of a first number of elements of the subset of elements based on respective channel measurements associated with a first number of measurement beams of the selected subset of measurement beams, where each element of the first number of elements may be positioned along a primary diagonal of the channel covariance matrix and determining each element of a second number of elements of the subset of elements based on respective channel measurements associated with a second number of measurement beams of the selected subset of measurement beams, where each element of the second number of elements may be positioned along the same row or the same column as an element of the first number of elements.

Some examples of the method, devices, and non-transitory computer-readable medium described herein may further include operations, features, means, or instructions for receiving control signaling including an indication of the element and selecting the element in accordance with the control signaling.

Some examples of the method, devices, and non-transitory computer-readable medium described herein may further include operations, features, means, or instructions for selecting the element in accordance with a rule for covariance matrix element selection.

In some examples of the method, devices, and non-transitory computer-readable medium described herein, determining the subset of elements of the channel covariance matrix may include operations, features, means, or instructions for determining each element of a first number of elements of the subset of elements based on respective channel measurements associated with a first number of measurement beams of the selected subset of measurement beams, where each element of the first number of elements may be positioned along a primary diagonal of the channel covariance matrix and determining each element of a second number of elements of the subset of elements based on respective channel measurements associated with a second number of measurement beams of the selected subset of measurement beams, where each element of the second number of elements may be positioned along a secondary diagonal of the channel covariance matrix, and where the second number of elements may be less than the first number of elements.

Some examples of the method, devices, and non-transitory computer-readable medium described herein may further include operations, features, means, or instructions for receiving control signaling including an indication of a scheme for determining the subset of elements of the channel covariance matrix using the selected subset of measurement beams, where determining the subset of elements of the channel covariance matrix may be in accordance with the scheme.

In some examples of the method, devices, and non-transitory computer-readable medium described herein, determining the remaining elements of the channel covariance matrix may include operations, features, means, or instructions for determining the remaining elements based on one or more computations using the determined subset of elements, where each element of the determined remaining elements includes an off-diagonal element of the channel covariance matrix.

Some examples of the method, devices, and non-transitory computer-readable medium described herein may further include operations, features, means, or instructions for obtaining an eigenvector of the channel covariance matrix based on the determined subset of elements and the determined remaining elements, where the obtained eigenvector may be associated with an eigenvalue having a highest absolute value among eigenvectors of the channel covariance matrix, and where the set of estimated beam weights for communication may be based on the obtained eigenvector.

In some examples of the method, devices, and non-transitory computer-readable medium described herein, the one or more computations may be based on the channel covariance matrix being associated with a single subcarrier and the beamformed communication may be performed via a set of multiple subcarriers.

In some examples of the method, devices, and non-transitory computer-readable medium described herein, determining the remaining elements of the channel covariance matrix may include operations, features, means, or instructions for setting a respective value of each element of the remaining elements to zero.

Some examples of the method, devices, and non-transitory computer-readable medium described herein may further include operations, features, means, or instructions for selecting the set of measurement beams from a set of multiple sets of measurement beams based on the set of measurement beams satisfying a condition.

In some examples of the method, devices, and non-transitory computer-readable medium described herein, a mean squared error associated with the set of measurement beams satisfying a mean squared error condition, an array gain associated with the set of measurement beams satisfying a gain condition, a range of amplitudes associated with the set of measurement beams satisfying an amplitude control threshold, and a number of measurement beams included in the set of measurement beams satisfying a memory threshold associated with storage of the set of measurement beams in a radio frequency integrated circuit (RFIC) chip memory.

Some examples of the method, devices, and non-transitory computer-readable medium described herein may further include operations, features, means, or instructions for receiving, from a second device, control signaling including an indication of the set of measurement beams, where the set of measurement beams may be selected in accordance with the control signaling.

In some examples of the method, devices, and non-transitory computer-readable medium described herein, the device includes a UE and the second device includes another UE or a network entity.

Some examples of the method, devices, and non-transitory computer-readable medium described herein may further include operations, features, means, or instructions for transmitting, to a second device, control signaling including an indication of the set of measurement beams.

In some examples of the method, devices, and non-transitory computer-readable medium described herein, the set of measurement beams may be associated with a number of antenna elements and the set of measurement beams may be selected from the set of multiple sets of measurement beams based on the number of antenna elements satisfying a threshold.

In some examples of the method, devices, and non-transitory computer-readable medium described herein, each beam of the selected subset of measurement beams includes a linear combination of at least one beam of the set of measurement beams.

DETAILED DESCRIPTION

Figure 1:
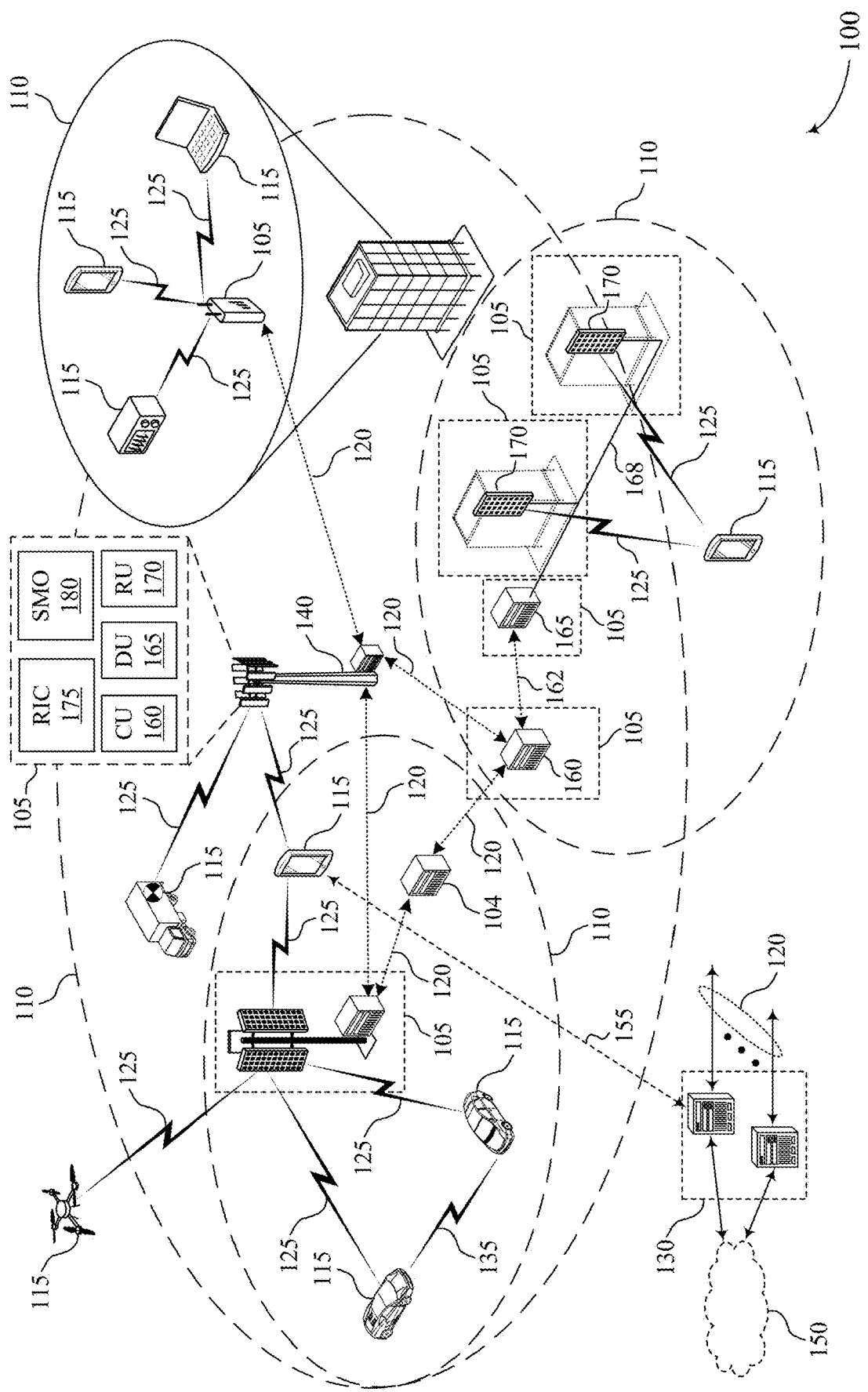
FIGS. 1 and 2 each show an example of a wireless communications system that supports techniques for speedy determination of adaptive beam weights in accordance with various aspects of the present disclosure.

A communication device may receive or transmit signaling using beamforming to compensate for signal loss (e.g., signal attenuation, which may be due to millimeter wave (mmW) communications). The communication device may store a codebook (e.g., a static codebook, a fixed codebook) and may select a beam from the codebook to use for transmitting or receiving beamformed communications. In some cases, such as cases in which the communication device operates in a mmW deployment, the communication device may encounter channel conditions beyond (e.g., different from) channel conditions that may be accommodated by the codebook. For example, based on the channel conditions, the communication device may determine to use a beam with one or more characteristics that may be unavailable within the codebook. In other words, the codebook may be used to determine (e.g., select, generate) one or more beams with characteristics that may be unsuitable for the channel conditions. In such cases, the communication device may determine a beam (e.g., beam weights of a beam, phase shifter levels and amplitude levels across antenna elements) based on measurements of a set of measurement beams (e.g., measurements of reference signals received using the set of measurement beams). Measurement beams may also be referred to herein as sampling beams, candidate beams, or more simply, beams. The communication device may generate (e.g., calculate) a channel covariance matrix based on measurements of the set of measurement beams, and may determine the beam for beamformed communications (e.g., transmission or reception) based on the generated channel covariance matrix.

In some cases, the communication device may generate each element (e.g., entry, value) of the channel covariance matrix based on a respective measurement of a respective measurement beam within the set of measurement beams. That is, to generate the channel covariance matrix, the communication device may perform measurements using each measurement beam of the set of measurement beams. Generating each entry (e.g., element) of the channel covariance matrix based on a corresponding measurement (e.g., performing measurements on each measurement beam of the set of measurement beams) may lead to increased latency associated with generating the channel covariance matrix. Additionally, or alternatively, generating each element of the channel covariance matrix based on a corresponding measurement may lead to the determined beam (e.g., for beamformed communications) becoming outdated relatively quickly. For example, channel conditions may change over a duration that is shorter than a duration (e.g., processing time) used by the communication device to generate the channel covariance matrix. In other words, the channel conditions may change while the communication device is generating the channel covariance matrix. In such an example, a beam determined using the generated channel covariance matrix may be outdated (e.g., ineffective for current channel conditions).

In accordance with various aspects of the present disclosure, a communication device (e.g., a UE, a network entity) may select a subset of measurement beams from a set of measurement beams, and may use the selected subset of measurement beams to generate a channel covariance matrix. A quantity of measurement beams included in the subset of measurement beams may be less than a quantity of elements (e.g., entries, values) of the channel covariance matrix, which may reduce a processing time associated with generating the channel covariance matrix. That is, by reducing the quantity of measurement beams used for generating the channel covariance matrix, the communication device may reduce a duration (e.g., the processing time) over which the channel covariance matrix is generated. The communication device may determine the set of measurement beams autonomously or based on signaling (e.g., control signaling) received from another communication device (e.g., another UE, another network entity).

The communication device may be configured with multiple schemes for selecting the subset of measurement beams. For example, the communication device may generate a first one or more elements of the channel covariance matrix based on measurements of a first number of measurement beams of the subset of measurement beams (e.g., measurements of reference signals received over the first number of measurement beams). The first one or more elements may include one or more diagonal elements of the channel covariance matrix (e.g., one or more elements of the channel covariance matrix positioned along a primary diagonal of the channel covariance matrix). Additionally, the communication device may generate a second one or more elements of the channel covariance matrix based on measurements of a second number of measurement beams of the subset (e.g., one or more measurement beams that are different from the first number of measurement beams). In accordance with a first scheme, the second one or more elements of the channel covariance matrix may include elements of the channel covariance matrix that are in the same row and the same column as a diagonal element (e.g., a reference diagonal element) of the one or more diagonal elements. In other words, the second number of measurement beams may include measurements beams that correspond to each element in the same row and each element in the same column as the reference diagonal element. In accordance with a second scheme, the second one or more elements of the channel covariance matrix may include elements of the channel covariance matrix that are in the same row or the same column as the reference diagonal element. That is, the second number of measurement beams may include measurement beams that correspond to each element in the same row or each element in the same column as the reference diagonal element. In some examples, the reference diagonal element may correspond to a diagonal element of the channel covariance matrix that is associated with a highest measured value among the one or more diagonal elements. In accordance with a third scheme, the second one or more elements of the channel covariance matrix may include elements of the channel covariance matrix that are positioned along a second diagonal (e.g., a secondary diagonal, which may be adjacent to the primary diagonal) of the channel covariance matrix. In other words, the second number of measurement beams may include measurement beams that correspond to each element positioned along the secondary diagonal of the channel covariance matrix.

The communication device may approximate one or more remaining elements of the channel covariance matrix (e.g., elements of the channel covariance matrix that are different from the first one or more elements and the second one or more elements) based on the first one or more elements and the second one or more elements of the channel covariance matrix. In some examples, generating the channel covariance matrix in accordance with one or more techniques for speedy determination of adaptive beam weights, as described herein, may lead to reduced processing and increased performance associated with generation of a channel covariance matrix, among other benefits. Aspects of the disclosure are initially described in the context of wireless communications systems. Aspects of the disclosure may also be described in the context of channel covariance matrix generation schemes and a process flow. Aspects of the disclosure are further illustrated by and described with reference to apparatus diagrams, system diagrams, and flowcharts that relate to techniques for speedy determination of adaptive beam weights.

FIG. 1 shows an example of a wireless communications system 100 that supports techniques for speedy determination of adaptive beam weights in accordance with various aspects of the present disclosure. The wireless communications system 100 may include one or more of the network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication links 125 (e.g., a radio frequency (RF) access link). For example, a network entity 105 may support a coverage area 110 (e.g., a geographic coverage area) over which the UEs 115 and the network entity 105 may establish one or more of the communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a network entity 105 (e.g., a single RAN node, such as a base station 140, a single network entity).

In some examples, a network entity 105 may be implemented in a disaggregated architecture (e.g., a disaggregated base station architecture, a disaggregated RAN architecture), which may be configured to utilize a protocol stack that is physically or logically distributed among two or more of the network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) (e.g., a CU 160), a distributed unit (DU) (e.g., a DU 165), a radio unit (RU) (e.g., an RU 170), a RAN Intelligent Controller (RIC), such as a RIC 175 (e.g., a Near-Real Time RIC (Near-RT RIC), a Non-Real Time RIC (Non-RT RIC)), a Service Management and Orchestration (SMO), such as a SMO 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more of DUs 165 or RUs 170, and the one or more of the DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more of RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more of the DUs 165 via a midhaul communication link 162 (e.g., F1, F1-c, F1-u), and a DU 165 may be connected to one or more of the RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by network entities 105 (e.g., respective network entities) that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., IAB nodes 104) may be partially controlled by each other. One or more of the IAB nodes 104 may be referred to as a donor entity or an IAB donor. One or more of the DUs 165 or one or more of the RUs 170 may be partially controlled by one or more of CUs 160 associated with a network entity 105 (e.g., a donor network entity, a donor base station). The one or more of the network entities 105 (e.g., IAB donors, donor network entities) may be in communication with one or more other of the network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more of the IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for speedy determination of adaptive beam weights as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as one or more other of the UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other of the network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each of the UEs 115 that receives wireless communication services may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In one or more of the wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a UE 115.

In some examples, a network entity 105 (e.g., a base station 140, an RU 170) may be movable and therefore provide communication coverage for a coverage area 110 that moves (e.g., a moving coverage area). In some examples, coverage areas 110 associated with different technologies may overlap, but the coverage areas 110 may be supported by a same of the network entity 105. In some other examples, the coverage areas 110 that overlap (e.g., overlapping coverage areas) associated with different technologies may be supported by network entities 105 (e.g., different network entities). The wireless communications system 100 may include, for example, a heterogeneous network in which different types of the network entities 105 provide coverage for one or more of the coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with one or more other of the UEs 115 via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the one or more other of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more radio frequency spectrum bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), unlicensed radio frequency spectrum band radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along one or more orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170)

may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity, a transmitting UE) along a single beam direction (e.g., a direction associated with the receiving device, such as a receiving network entity or a receiving UE). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A communication device (e.g., the UE 115, the network entity 105) may select a beamforming weight set (e.g., a beam) based on a codebook. For example, the communication device may store a codebook (e.g., a static codebook, a fixed codebook) and may select a beam from the codebook to use for transmitting or receiving beamformed communications. In some cases, however, channel conditions experienced at the communication device may be beyond (e.g., different from) channel conditions that may be accommodated by the codebook. For example, the codebook may be used to determine (e.g., select, generate) one or more beams with characteristics that may be unsuitable for the channel conditions. In such cases, the communication device may determine a beam (e.g., beam weights of a beam, phase shifter levels of a beam, amplitude of a beam) based on measurements of a set of measurement beams (e.g., measurements of reference signals received using the set of measurement beams). The quantity of measurement beams included in the set of measurement beams may be based on (e.g., correspond to) a quantity of elements included in the channel covariance matrix. Accordingly, the communication device may generate (e.g., calculate) the channel covariance matrix based on measurements of each measurement beam of the set of measurement beams, and may determine the beam for beamformed communications (e.g., transmission or reception) based on the generated channel covariance matrix. In some cases, generating the channel covariance matrix based on measurements of each measurement beam of the set of measurements beams may lead to increased latency and reduce performance of a beam determined via the generated channel covariance matrix.

In some examples, the communication device may support a framework for selecting a subset of measurement beams from the set of measurement beams. For example, in accordance with the framework, the communication device (e.g., the UE 115, the network entity 105) may select the subset of measurement beams from the set of measurement beams, and may use the selected subset of measurement beams to generate the channel covariance matrix. A quantity of measurement beams of the subset of measurement beams may be less than the quantity of elements (e.g., entries, values) of the channel covariance matrix, which may reduce a processing time associated with generating the channel covariance matrix. The communication device may determine the set of measurement beams autonomously or based on signaling (e.g., control signaling) received from another communication device (e.g., another UE 115, another network entity 105).

Figure 2:
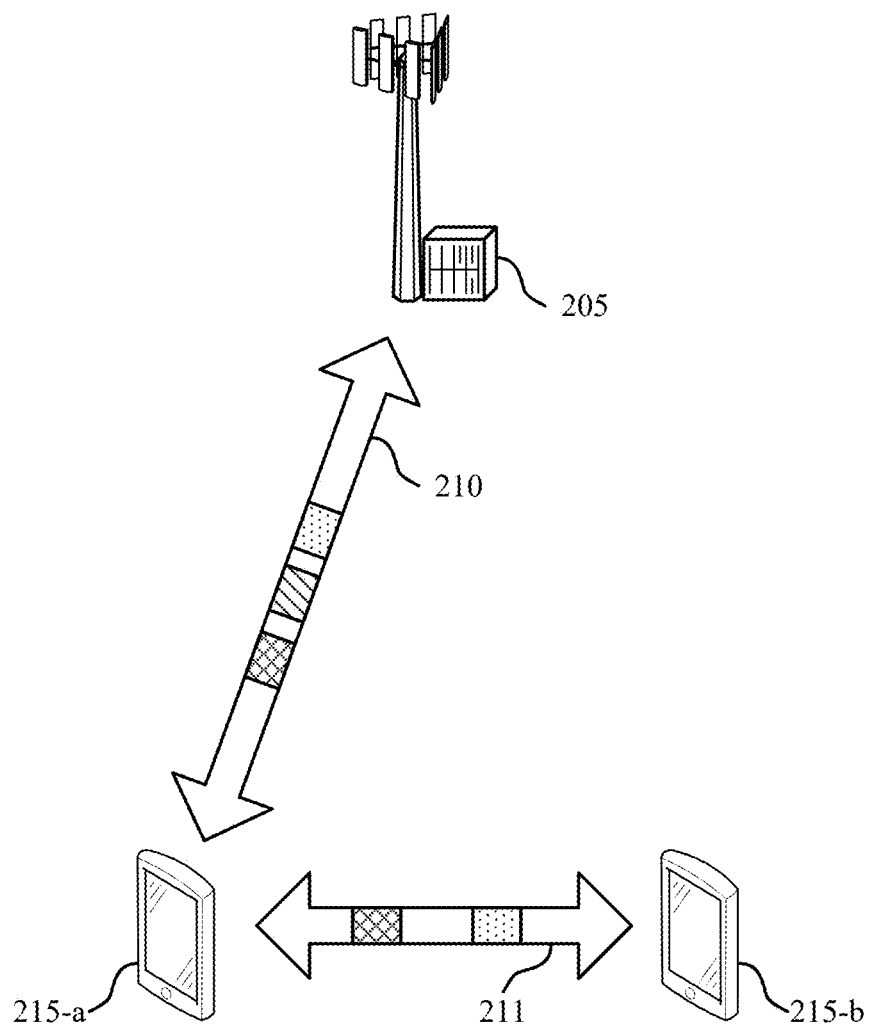
Figure 2:
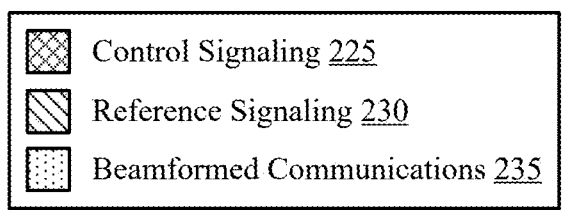

FIG. 2 shows an example of a wireless communications system 200 that supports techniques for speedy determination of adaptive beam weights in accordance with various aspects of the present disclosure. In some cases, aspects of the wireless communications system 200 may implement or be implemented by aspects of FIG. 1. For example, the wireless communications system 200 may include a network entity 205, which may be an example of the network entity 105 (as shown in FIG. 1). The wireless communications system 200 may also include a UE 215-a and a UE 215-b, which may be examples of the UEs 115 (as shown in FIG. 1). The operations illustrated in FIG. 2 as being performed by the UE 215-a may also be performed by another type of communications device, such as the network entity 205. In some cases, the UE 215-a may communicate beamformed communications 235 (e.g., perform beamformed communications) based on generating a channel covariance matrix in accordance with one or more techniques of the present disclosure. The UE 215-a may communicate with the network entity 205 via a first communication link 210 (e.g., a Uu interface), which may be an example of a communication link 125 (as shown in FIG. 1), and may communicate with UE 215-b via a second communication link 211 (e.g., a sidelink, a PC5 interface), which may be an example of a D2D communication link 135 (as shown in FIG. 1).

In some cases, the UE 215-a, the UE 215-b, or the network entity 205, or a combination thereof, may use multiple antennas to perform beamformed communications, which may, for example, increase a link budget (e.g., increase the amount of directional transmission power to effectively increase receive power at a receiver) associated with the beamformed communication. For example, the UE 215-a, the UE 215-b, or the network entity 205, or a combination thereof, may use codebook-based beamforming, directional RF beamforming, analog beamforming, or another approach to beamforming.

In some examples, the UE 215-a, the UE 215-b, or the network entity 205, or a combination thereof, may store a codebook (e.g., a fixed codebook) in a memory (e.g., a radio frequency integrated circuit (RFIC) chip memory) to use for determining one or more beams to use for beamformed communications (e.g., including beam training). The UE 215-a, the UE 215-b, or the network entity 205, or a combination thereof, may store the codebook based on a memory or complexity constraint of the UE 215-a, the UE 215-b, or the network entity 205, or a combination thereof. In some cases, the codebook may store beam weights that are used in determining one or more beams for beamformed communication. In other words, the UE 215-a, the UE 215-b, or the network entity 205, or a combination thereof, may perform beam training over the codebook. In some cases, such beam training may be referred to as a static codebook approach.

In some other examples, the UE 215-a, the UE 215-b, or the network entity 205, or a combination thereof, may use beam weights that are not stored in the RFIC chip memory. For example, the UE 215-a, the UE 215-b, or the network entity 205, or a combination thereof, may use a beam with a wider angular spread than the codebook may provide, a beam that may lead to a lower block error rate (BLER) than the codebook may provide, or a beam that leads to smaller hand blockage losses than the codebook may provide, or any combination thereof. In such examples, the UE 215-a, the UE 215-b, or the network entity 205, or a combination thereof, may dynamically (e.g., in mission mode operations) determine a beam (e.g., one or more aspects of a beam for the beamformed communication, including phase shifter levels and amplitude levels associated with the beam) dynamically based on channel conditions. In some cases, such an approach to determining a beam may be referred to as an adaptive codebook approach.

The UE 215-a, the UE 215-b, or the network entity 205, or a combination thereof, may determine a channel matrix H(k) (e.g., an N×M matrix) based on received signaling over subcarrier k. In some cases, the effective channel matrix h(k) seen after beamforming at the transmit side may be expressed in accordance with the following Equation 1:

$$h(k) = H(k)f \qquad (1)$$

in which f (e.g., an M×1 matrix) may be a beamforming vector that a transmitting device (e.g., the UE 215-a, the UE 215-b, or the network entity 205 that transmitted the signaling) may use on the channel matrix H(k) (e.g., an N×M matrix). The UE 215-a, the UE 215-b, or the network entity 205, or a combination thereof, may use beam weights (e.g., receive beam weights) g (e.g., an M×1 matrix) to receive the signaling and a reference signal received power (RSRP) associated with the received signaling may be described in accordance with the following Equation 2:

$$RSRP = \sum_k |g^H h(k)|^2 = g^H * \left(\sum_k h(k)h(k)^H\right) * g. \qquad (2)$$

In accordance with Equation 2, the UE 215-a, the UE 215-b, or the network entity 205, or a combination thereof, may generate an estimate of the channel covariance matrix. In other words, determining the RSRP in accordance with Equation 2 (e.g., with the beam weights g) leads to R, an estimate of the channel covariance matrix (e.g., as seen at the UE 215-a, the UE 215-b, or the network entity 205, or a combination thereof). In some examples, to generate (e.g., estimate) an N×N channel covariance matrix (e.g., which contains $N^2$ real parameters), the UE 215-a, the UE 215-b, or the network entity 205, or a combination thereof, may receive $N^2$ reference signals associated with $N^2$ RSRP measurements. The reference signals may be received via $N^2$ sampling beams (e.g., candidate beams, receive beams, measurement beams, beams), which may be linear combinations of one or more sampling beams of a set of sampling beams. An N×N orthonormal matrix may include column vectors $w_1, w_2, w_3, \ldots, w_N$. A column vector $w_i$ (or a linear combination of column vectors) may correspond to a sampling beam. As an illustrative example, to generate the channel covariance matrix, the UE 215-a, the UE 215-b, or the network entity 205, or a combination thereof, associated with a 4×4 channel covariance matrix may measure 16 (e.g., $N^2$) sampling beams. The sampling beams may include linear combinations of the sampling beams. That is, the set of 16 sampling beams may include: $w_1, w_2, w_3, w_4, w_1+w_2, w_1+iw_2, w_1+w_3, w_1+iw_3, w_1+w_4, w_1+iw_4, w_2+w_3, w_2+iw_3, w_2+w_4, w_2+iw_4, w_3+w_4, w_3+iw_4$, where i may represent an imaginary number (that is, $\sqrt{-1}$). Accordingly, for N=4, $w_1, w_2, w_3$, and $w_4$ may be four sampling beams of the set of 16 sampling beams, where each sampling beam (e.g., $w_i$) may be a 4×1 (in general, an N×1) column vector. In some cases, the 16 sampling beams may be stored in an RFIC chip memory of the UE 215-a, the UE 215-b, or the network entity 205. Thus, a choice of the sampling beams for generating the channel covariance matrix may affect the communication performance of the UE 215-a, the UE 215-b, or the network entity 205.

In some cases, generating an N×N channel covariance matrix may include receiving $N^2$ reference signals and measuring $N^2$ RSRP measurements associated with the $N^2$ reference signals. For example, the sampling beams may be represented as one or more column vectors ($w_1$ through $w_N$)

of an orthonormal matrix, and one or more measured (e.g., estimated) RSRP measurements associated with the one or more column vectors may be $R_1$ through $R_N$ (e.g., elements of a channel covariance matrix R). Using the RSRP measurements $R_1$ through $R_N$ (e.g., $R_1$, $R_2$, ..., $R_N$), the UE 215-a, the UE 215-b, or the network entity 205, or a combination thereof, may estimate $R_n = w_n^H R_n w_n$, where n may be an integer from 1 to N. Additionally, one or more linear combinations of the column vectors, denoted as $w_k + w_n$ and $w_k + i w_n$, where k≠n, may be associated with one or more RSRP measurements, where $R_{N+1}$ and $R_{N+2}$ may represent RSRP measurements realized with $w_k + w_n$ and $w_k + i w_n$, respectively. Accordingly, the UE 215-a, the UE 215-b, or the network entity 205, or a combination thereof, may determine $R_{N+1}$ in accordance with the following Equation 3 and $R_{N+2}$ in accordance with the following Equation 4:

$$R_{N+1} = R_k + R_n + 2|w_k^H R w_n|\cos\theta \quad (3)$$

$$R_{N+2} = R_k + R_n - 2|w_k^H R w_n|\sin\theta \quad (4)$$

in which the parameter θ may be determined in accordance with the following equation 5:

$$\theta = \angle w_k^H R w_n, \quad (5)$$

and in which $w_k^H R w_n$ may be estimated. Accordingly, because the cross terms of the form $w_k^H R w_n$ may be estimated, R may also be estimated. That is, because the cross terms of the form $w_k^H R w_n$ may be estimated, the UE 215-a, the UE 215-b, or the network entity 205, or a combination thereof, may generate the channel covariance matrix, R, with N(N−1)/2 choices of k and n and, as such, measurement of $$N + \frac{2N(N-1)}{2} = N^2$$

reference signals.

In some cases, the UE 215-a, the UE 215-b, or the network entity 205, or a combination thereof, may generate a received signal model (e.g., may model a received signal) in accordance with the following Equation 6:

$$y_i = g_i^H H f + g_i^H n_i, \quad (6)$$

in which i=1, ..., |C|. In a block matrix representation, the received signal model may be represented as Y=GH+N, where Y, G, H, and N may be determined in accordance with the following Equations 7, 8, 9, and 10, respectively:

$$Y = \begin{bmatrix} y_1 \\ \vdots \\ y_{|C|} \end{bmatrix}_{|C|\times 1} \quad (7)$$

$$G = \begin{bmatrix} g_1^H \\ \vdots \\ g_{|C|}^H \end{bmatrix}_{|C|\times N} \quad (8)$$

$$H = Hf|_{N\times 1} \quad (9)$$

$$N = \begin{bmatrix} g_1^H n_1 \\ \vdots \\ g_{|C|}^H n_{|C|} \end{bmatrix}_{|C|\times 1}. \quad (10)$$

Thus, estimating a combining vector (e.g., an optimal or otherwise suitable combining vector) for the beamformed communications may be equivalent to estimating H in accordance with Equation 9. In some cases, the UE 215-a, the UE 215-b, or the network entity 205, or a combination thereof, may determine a minimum variance unbiased estimator in a closed-form. Additionally, or alternatively, the UE 215-a, the UE 215-b, or the network entity 205, or a combination thereof, may determine a quality of the variance unbiased estimator (e.g., as an optimization over G) of beamforming vectors associated with the UE 215-a, the UE 215-b, or the network entity 205, or a combination thereof.

In some cases, the UE 215-a, the UE 215-b, or the network entity 205, or a combination thereof, may form a beam (e.g., receive beam) using one or more antenna elements of an antenna array at the UE 215-a, the UE 215-b, or the network entity 205, or a combination thereof. For example, an antenna element of an antenna array (e.g., each antenna element of an antenna array) of the UE 215-a, the UE 215-b, or the network entity 205, or a combination thereof, may correspond to (e.g., may be used to form) a receive beam, or a combination of the antenna elements may correspond to (e.g., may be used to form) a receive beam. Thus, sampling one or more receive antenna elements may correspond to sampling one or more beams (e.g., data streams). In some cases, sampling each antenna element (e.g., separately) may lead to a reduced mean squared error associated with generating the channel covariance matrix. For example, sampling each antenna element may reduce (e.g., minimize) a product of a mean squared error of the estimation of gains associated with different (e.g., various, separate) antenna elements. In some examples, sampling each antenna element may reduce (e.g., minimize) a mean squared error of a set of beams (e.g., a minimum mean squared error of a set of different data streams). In other words, sampling each antenna element may enable the UE 215-a, the UE 215-b, or the network entity 205, or a combination thereof, to estimate multiple (e.g., all) components of g with a relatively high accuracy. Additionally, or alternatively, sampling each antenna element may reduce (e.g., minimize) sums or products of a functional of a mean squared error (e.g., may enable the UE 215-a, the UE 215-b, or the network entity 205, or a combination thereof, to trade-off between different extremes by selecting different functionals), or any combination thereof. In some examples, a matrix G that is semi-unitary (e.g., satisfies $G^H G=I$) may lead to improved beamformed communications at the UE 215-a, the UE 215-b, or the network entity 205, or a combination thereof. For example, a DFT gain or an equal gain unitary codebook (e.g., that may point at beamspace-orthogonal directions) may lead to improved beamformed communications of the UE 215-a, the UE 215-b, or the network entity 205, or a combination thereof.

In accordance with various aspects of the present disclosure, the UE 215-a may select a channel covariance matrix generation scheme, a set of beams (e.g., sampling beams), and a subset of beams from the set of beams for use in generating the channel covariance matrix. In some examples, selection of the channel covariance matrix generation scheme, the set of beams, the subset of beams, or any combination thereof, may be selected based on control signaling 225. For example, the UE 215-*a* may receive the control signaling 225 from another communication device. For example, the UE 215-*a* may receive the control signaling 225 from the network entity 205, the UE 215-*b*, or both. In some cases, the control signaling 225 may indicate information associated with generating a channel covariance matrix. For example, the control signaling may indicate which channel covariance matrix generation scheme of a set of channel covariance matrix generation schemes the UE 215-*a* may use for generation of the channel covariance matrix. Additionally, or alternatively, the control signaling 225 may indicate a set of beams (e.g., receive beams, sampling beams, measurement beams, candidate beams) from which the UE 215-*a* may select a subset of beams for use in generating the channel covariance matrix.

In some cases, the UE 215-*a* may receive reference signaling 230 from the network entity 205 via one or more of the subset of beams according to the selected channel covariance matrix generation scheme. The reference signaling 230 may include synchronization signal blocks (SSBs), channel state information reference signals (CSI-RSs), or both. In some cases, the reference signaling 230 may include a quantity of reference signals equal to the quantity of beams in the selected subset of beams, which may be different from (e.g., less than) a quantity of elements in the channel covariance matrix.

The UE 215-*a* may generate a channel covariance matrix according to the channel covariance matrix generation scheme based on measurements of the reference signaling 225 received via the subset of beams. The channel covariance matrix generation scheme may be an example of one or more channel covariance matrix generation schemes illustrated by and described with reference to FIG. 3. Based on the generated channel covariance matrix (e.g., based on an eigenvector of the channel covariance matrix), the UE 215-*a* may identify a beam for communicating beamformed communications 235 with the network entity 205, the UE 215-*b*, or both. For example, the UE 215-*a* may determine an eigenvector (e.g., a dominant eigenvector, an eigenvector associated with the largest eigenvalue of the channel covariance matrix), and may identify beam weights associated with the beam based on the eigenvector. The UE 215-*a* may communicate the beamformed communications 235 based on the beam identified using the generated channel covariance matrix. In some cases, the beamformed communications 235 may be communicated with the network entity 205, the UE 215-*b*, or both.

Figure 3:
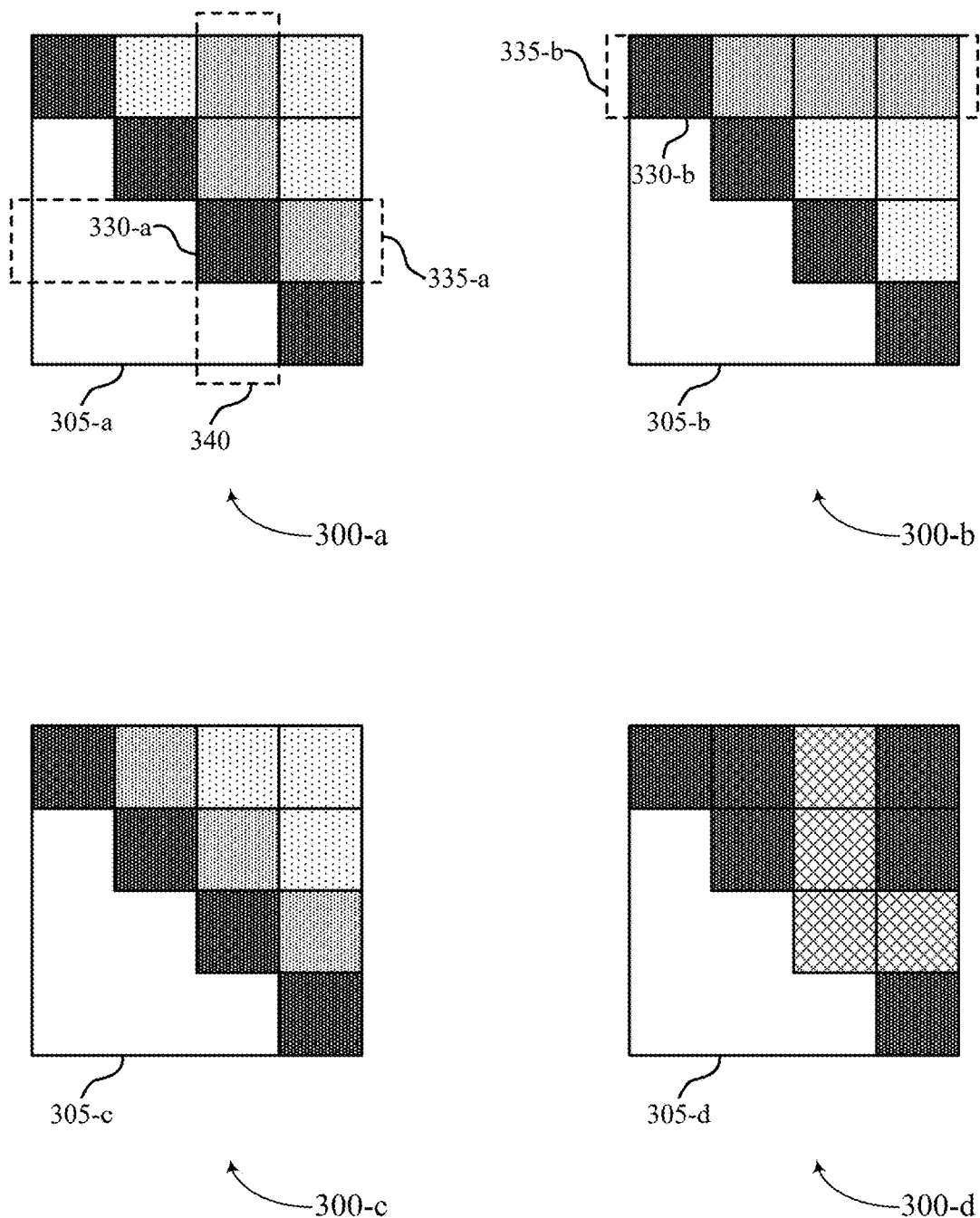
FIG. 3 shows examples of channel covariance matrix generation schemes that support techniques for speedy determination of adaptive beam weights in accordance with various aspects of the present disclosure.

FIG. 3 shows examples of channel covariance matrix generation schemes 300 that support techniques for speedy determination of adaptive beam weights in accordance with various aspects of the present disclosure. In some cases, aspects of the channel covariance matrix generation schemes 300 (e.g., a channel covariance matrix generation scheme 300-*a*, a channel covariance matrix generation scheme 300-*b*, a channel covariance matrix generation scheme 300-*c*, and a channel covariance matrix generation scheme 300-*d*) may implement or be implemented by one or more aspects of FIGS. 1 and 2. For example, a UE 115 may utilize one or more of the channel covariance matrix generation schemes 300 to generate a channel covariance matrix 305 (e.g., a channel covariance matrix 305-*a*, a channel covariance matrix 305-*b*, a channel covariance matrix 305-*c*, and a channel covariance matrix 305-*d*), which may be examples of the channel covariance matrix as described with respect to FIGS. 1 and 2. In some cases, the channel covariance matrix generation schemes 300 may describe an order (among other factors) for determining one or more elements (e.g., entries, values) of the channel covariance matrices 305 and approximating one or more remaining elements of the channel covariance matrices 305.

For example, in accordance with various aspects of the present disclosure, a communication device (e.g., a UE 115, a network entity 105) may select a subset of beams (e.g., sampling beams, measurement beams, candidate beams) from a set of beams for generating a channel covariance matrix. The subset of beams may include one or more linear combinations of the beams of the selected set of beams (e.g., may include one or more of $w_1$, $w_2$, $w_3$, $w_4$, $w_1+w_2$, $w_1+iw_2$, $w_1+w_3$, $w_1+iw_3$, $w_1+w_4$, $w_1+iw_4$, $w_2+w_3$, $w_2+iw_3$, $w_2+w_4$, $w_2+iw_4$, $w_3+w_4$, or $w_3+iw_4$). In some examples, the communication device may also select the set of beams from one or more sets of beams. For example, a structure of the set of beams may be determined using one of matrices $W_1$, $W_2$, and $W_3$. That is, the matrices $W_1$, $W_2$, and $W_3$ may define three (different) structures for three (different) sets of beams. In other words, the matrices $W_1$, $W_2$, and $W_3$ may represent three (different) sets of beams. The matrices $W_1$, $W_2$, and $W_3$ may each include four (4×1) column vectors (e.g., may each include $w_1$, $w_2$, $w_3$, and $w_4$, which may each represent a beam of the set of beams). Each element of $W_1$, $W_2$, and $W_3$ may represent a beam weight for exciting an antenna element of an array of antenna of the communication device. The matrices $W_1$, $W_2$, and $W_3$ may be determined in accordance with the following Equations 11, 12, and 13, respectively:

$$W_1 = \frac{1}{2} * \begin{bmatrix} 1 & 1 & 1 & 1 \\ 1 & -1 & i & -i \\ 1 & 1 & -1 & -1 \\ 1 & -1 & -i & i \end{bmatrix} \quad (11)$$

$$W_2 = \frac{1}{2} * \begin{bmatrix} 1 & 1 & 1 & 1 \\ 1 & -1 & -1 & 1 \\ 1 & 1 & -1 & -1 \\ 1 & -1 & 1 & -1 \end{bmatrix} \quad (12)$$

$$W_3 = \begin{bmatrix} 0 & 1 & 0 & 0 \\ 0 & 0 & 1 & 0 \\ 0 & 0 & 1 & 0 \\ 0 & 0 & 0 & 1 \end{bmatrix}. \quad (13)$$

In some cases, although each of matrices $W_1$, $W_2$, and $W_3$ may be unitary (e.g., each column of each matrix is orthogonal to each other column and satisfy a unit norm condition, which may lead to improved estimation performance), selecting a set of beams using $W_1$, $W_2$, or $W_3$ may be associated with one or more tradeoffs (e.g., benefits and drawbacks) for beamformed communication of the communication device. In other words, selection of the set of beams may lead to tradeoffs for learning a channel structure associated with the beamformed communications.

For example, the communication device may select a set of beams in accordance with matrices $W_1$ or $W_2$ based on the set of beams having (e.g., based on the matrices $W_1$ or $W_2$ each providing for a set of beams with) an array gain that satisfies a gain condition. In some examples, selecting a set of beams with equal gain across the antenna elements (e.g., all antenna elements) of an antenna array of the communication device (e.g., in accordance with matrix $W_1$ or $W_2$) may improve gains associated with the beamformed communication. However, selecting a set of beams with equal gain across the antenna elements of an antenna array of the communication device may add data to be stored and communicated by the communication device, increasing processing latency and memory usage in the communication device. Additionally, excluding one or more antenna elements in the set of beams (e.g., not including a beam weight for one or more antenna elements in the matrix, such as in accordance with matrix $W_3$) may lead to a reduced processing time. However, excluding one or more antenna elements in the set of beams (e.g., not including a beam weight for one or more antenna elements in the matrix) may lead to reduced accuracy of measurement estimates in noisy settings (e.g., as beamforming array gain in sampling may be reduced).

Additionally, or alternatively, although sets of beams with equal gain across the antenna elements of an antenna array (e.g., in accordance with matrices $W_1$ or $W_2$) may improve gains associated with beamformed communication, some such sets of beams may be associated with an increased quantity of amplitude levels (e.g., quantization levels) to generate and implement the linear combinations of the beams as the set. For example, the linear combinations of beams within $W_1$ and $W_2$ may include real and imaginary parts of elements of the matrices, including, for example, $w_i+w_1$ and $\|w_1+w_j\|$, and $w_1+iw_j$ and $\|w_1+iw_j\|$, where $w_j$ may represent a column (e.g., any of the columns) of a respective matrix. Such linear combinations may be of the set $$\left\{0, \frac{1}{2}, \frac{1}{\sqrt{2}}, \frac{1}{2\sqrt{2}}\right\},$$

and an amplitude of the beam weights for each element may include a value from the subset $$\left\{0, \frac{1}{2}, \frac{1}{\sqrt{2}}\right\}.$$

Thus, in addition to a full amplitude level and a zero amplitude level, a communication device implementing $W_1$ or $W_2$ may use two (additional) amplitude levels (e.g., quantization levels), such as −3 dB and −1.5 dB. However, the linear combinations of $W_3$ may lead to the communication device using, in addition to the full amplitude level and the zero amplitude level, one (additional) amplitude level, which may be −1.5 dB. Thus, implementation of $W_3$ may be less complex (e.g., easier) relative to implementation of $W_1$ or $W_2$. In other words, the communication device may select a set of beams in accordance with matrix $W_3$ based on the set of beams having (e.g., based on the matrix $W_3$ providing for a set of beams with) a range of amplitudes that satisfy an amplitude control threshold.

In some examples, although sets of beams with equal gain across the antenna elements of an antenna array (e.g., in accordance with matrix $W_1$ or $W_2$) may improve gains associated with beamformed communication, the communication device may store the beams of the set and linear combinations of the beams in RFIC chip memory, which may be constrained (e.g., limited). Thus, the communication device may not be able to store a large quantity of beams. For example, $N^2$ linear combination of beams may be stored in the RFIC chip memory for a set of beams, such as a set of beams determined using matrix $W_1$ or $W_2$. However, the communication device may reuse one or more beams (e.g., static/directional beams) for $w_i$ to reduce the storage space used by the set of measurement beams. In some cases, the communication device may reuse beams for $w_i$ to save N storage units, which may lead to a reduced storage burden of $N^2$—N=N(N−1) for the set of beams and the linear combinations of the beams. In other words, the communication device may select a set of beams that may reuse one or more static beams for $w_i$ based on the set of beams (e.g., a quantity of beams within the set of beams) satisfying a memory threshold associated with storage of the set of beams in a RFIC chip memory of the communication device. In some cases, the communication device may achieve the reduced storage burden at the cost of reduced performance (e.g., a performance penalty vs. a performance tradeoff), for example, because beams (e.g., static beams) may be less effective at reducing a mean squared error associated with generating the channel covariance matrix. Accordingly, in some other examples, the communication device may select a set of beams (e.g., in accordance with matrices $W_1$ or $W_2$) based on a mean squared error associated with the set of measurement beams satisfying a mean squared error condition.

In some examples, based on one or more tradeoffs, the communication device may select a set of beams (e.g., in accordance with one of $W_1$, $W_2$, and $W_3$, or another matrix associated with beam structures) to use in generating a channel covariance matrix. Additionally, or alternatively, the communication device may receive control signaling (e.g., from another communication device, such as a network entity or a UE) indicating one of $W_1$, $W_2$, or $W_3$ (or another set of beams) for use in generating the channel covariance matrix, and the communication device may select the set of beams based on receiving the control signaling. Additionally, or alternatively, the communication device may be configured to use $W_1$, $W_2$, or $W_3$ (or another set of beams) for generating the channel covariance matrix.

In some cases, the set of beams selected by the communication device may be a Hadamard matrix. For example, $W_2$ may be a size-4 Hadamard matrix. In some examples (e.g., if the communication device knows a Hadamard matrix of size $2^{k-1}$), the communication device may construct a Hadamard matrix $W_H$ of size $2^k$ using the following iterative parametric generative equation:

$$W_H = \begin{bmatrix} H_{2^{k-1}} & H_{2^{k-1}} \\ H_{2^{k-1}} & -H_{2^{k-1}} \end{bmatrix}, \quad (14)$$

where $H_{2^{k-1}}$ represents a Hadamard matrix of size $2^{k-1}$.

In some cases, each column of $W_H$ may be used for generating beams in a set of beams that the communication device may select. Hadamard matrices may be available for small (e.g., practical, N=4) antenna array size dimensions, and thus the communication device may reuse beams from a Hadamard matrix to improve efficiency. For example, for some antenna dimensions (e.g., N=4), the communication device may use multiple Hadamard matrices to determine multiple beams (e.g., multiple Hadamard matrix constructions may be possible for some antenna dimensions). In other words, the set of beams determined using the Hadamard matrix may be associated with a number of antenna elements, and the communication device may select the set of beams (e.g., in accordance with Hadamard matrix) from multiple sets of beams based on the number of antenna elements satisfying a threshold.

In accordance with various aspects of the present disclosure, a communication device may use a channel covariance matrix generation scheme 300 (e.g., and a set of beams, such as may be determined using $W_1$, $W_2$, or $W_3$) to generate a channel covariance matrix 305, in which the channel covariance matrix generation scheme 300 may reduce a latency associated with generating a channel covariance matrix 305. In each of the channel covariance matrix generation schemes 300, the communication device may determine one or more of first determined elements 310 and one or more of second determined elements 315 in each of the channel covariance matrices 305. In some cases, determining an element may include measuring at least one value (e.g., RSRP measurement, phase measurement) associated with a reference signal received via a beam corresponding to the element and, in some examples, entering (e.g., storing) the value in the channel covariance matrix in a location corresponding to the element. Additionally, the communication device may approximate elements 320 of the channel covariance matrix, in which approximating an element 320 may include calculating an estimated value for the elements 320 based on the first determined elements 310, the second determined elements 315, zeroed-out elements 325, or any combination thereof, and entering the estimated value into the channel covariance matrix in a location (e.g., a position of the channel covariance matrix) corresponding to the element. Additionally, or alternatively, the communication device may zero (e.g., set to zero) one or more of zeroed-out elements 325, in which zeroing an element may include entering a zero value into the channel covariance matrix in a location corresponding to that element. Although the channel covariance matrices 305 includes four rows and four columns in the N=4 case, the techniques of the present disclosure may be applied to channel covariance matrices with any quantity of rows or columns corresponding to a general N.

In accordance with the channel covariance matrix generation scheme 300-a, the channel covariance matrix generation scheme 300-b, and the channel covariance matrix generation scheme 300-c, the communication device may determine the first determined elements 310 of the channel covariance matrix 305-a, the channel covariance matrix 305-b, and the channel covariance matrix 305-c, respectively, using one or more beams of a subset of beams (e.g., using one or more column vectors of an orthonormal matrix, such as column vectors $w_i$, $w_2$, $w_3$, and $w_4$ as described with reference to FIG. 2). In some cases, the first determined elements 310 may include the diagonal elements of the channel covariance matrices 305 (e.g., elements of the channel covariance matrices 305 that are positioned on the primary diagonal).

Additionally, in accordance with the channel covariance matrix generation scheme 300-a, the communication device may determine, based on one or more beams of the subset of beams (e.g., one or more linear combinations of $w_i$, $w_2$, $w_3$, and $w_4$), the second determined elements 315 of the channel covariance matrix 305-a. In some cases, the second determined elements 315 of the channel covariance matrix 305-a may include elements that are in a same row and a same column as a reference diagonal element 330-a. That is, the second determined elements 315 may be anchored to the reference diagonal element 330-a. For example, the second determined elements 315 of the channel covariance matrix 305-a may include elements in a row 335-a of a reference diagonal element 330-a (e.g., elements of the row 335-a that are lower in index value than the reference diagonal element 330-a, elements of the row 335-a that are above the reference diagonal element 330-a) and elements in a column 340 of the reference diagonal element 330-a (e.g., elements of the column 340 that are higher in index value than the reference diagonal element 330-a, elements of the column 340 that are on the right of the reference diagonal element 330-a). In some examples, the communication device may determine the reference diagonal element 330-a (e.g., an index of the reference diagonal element) based on the reference diagonal element 330-a being associated with a largest value (e.g., RSRP value) of the first determined elements 310 (e.g., the diagonal elements) of the channel covariance matrix 305-a. That is, the communication device may determine that the reference diagonal element 330-a of the channel covariance matrix 305-a has a largest RSRP value among the first determined elements 310. For example, the index of the reference diagonal element 330-a may be represented as k*, and k*may be equal to i (e.g., i=k*) in which $R_i$ may have the largest value among the first determined elements 310.

In some examples, there may be k*−1 elements in the column space and N-k* elements in the row space. As illustrated in the example of FIG. 3, for N=4 and k*=3, the second determined elements 315 includes 2 elements in the column space and 1 element in the row space. Accordingly, the second determined elements 315 may include N−1 elements (e.g., 3 elements) and, as such, the communication device may experience a latency of 3N−2 reference signals. That is, to determine the first determined elements 310 and the second determined elements 315 of the channel covariance matrix 305-a, the communication device may measure 3N−2 reference signals. In other words, the communication device may estimate $w_{k*}^H R w_i$ (for i≥k*+1) and $w_i^H R w_{k*}$ (for ≥k*−1).

In accordance with the channel covariance matrix generation scheme 300-b, the communication device may determine, based on one or more beams of the subset of beams (e.g., one or more linear combinations of $w_1$, $w_2$, $w_3$, and $w_4$), the second determined elements 315 of the channel covariance matrix 305-b. In some cases, the second determined elements 315 of the channel covariance matrix 305-b may include elements that are in a row of a reference diagonal element 330-b, or that are in a column of the reference diagonal element. In some cases, the communication device may receive an indication of which diagonal element of the channel covariance matrix 305-b is the reference diagonal element (e.g., may receive an indication of the reference diagonal element 330-b). Additionally, or alternatively, the communication device may autonomously determine the reference diagonal element 330-b (e.g., based on a pre-defined rule for covariance matrix element selection). As illustrated in the example of FIG. 3, the second determined elements of the channel covariance matrix 305-b that are within a row 335-b of the reference diagonal element 330-b.

In some cases, the one or more beams of the subset of beams for determining the second determined elements 315 of the channel covariance matrix 305-b may be of the form $w_{k*}+w_1$ and $w_{k*}+iw_1$, . . . , $w_{k*}+w_{k*-1}$ and $w_{k*}+iw_{k*-1}$, followed by $w_{k*}+w_{k*+1}$ and $w_{k*}+iw_{k*+1}$, . . . , $w_{k*}+w_N$ and $w_{k*}+iw_N$, respectively, where k* may represent an index of the reference diagonal element 330-b. Thus, using the channel covariance matrix generation scheme 300-b, a communication device may estimate $w_n^H R w_n$, in which n=1, . . . , N, and $w_{k*}^H R w_n$, in which n n≠k*. In some cases, a communication device implementing the channel covariance matrix generation scheme 300-b may measure N reference signaling (e.g., in the first step used to obtain the first determined elements 310) and (N−1)2 reference signals (e.g., in the second step used to obtain the second determined elements 315). That is, in accordance with the channel covariance matrix generation scheme 300-*b* the communication device may measure 3N−2 reference signals.

In accordance with the channel covariance matrix generation scheme 300-*c*, the communication device may determine, based on one or more beams of the subset of beams (e.g., one or more linear combinations of $w_1$, $w_2$, $w_3$, and $w_4$), the second determined elements 315 of the channel covariance matrix 305-*c*. In some cases, the second determined elements 315 of the channel covariance matrix 305-*c* may include elements in a secondary diagonal of the channel covariance matrix 305-*c* (e.g., elements of the channel covariance matrix 305-*c* located in (positioned along) a secondary diagonal, which may include less elements than the primary diagonal). In some cases, the communication device may autonomously determine a secondary diagonal, or may determine the secondary diagonal based on receiving control signaling indicating the secondary diagonal.

In some cases, determining the second determined elements 315 of the channel covariance matrix 305-*c* (e.g., the secondary diagonal elements) may include measuring the beams represented by $w_k+w_{k+1}$ and $w_k+iw_{k+1}$ for k=1, . . . , N−1. Thus, to determine the first determined elements 310 and the second determined elements 315 in accordance with the channel covariance matrix generation scheme 300-*c*, the communication device may measure N reference signals (e.g., in the first step to obtain the first determined elements 310) and 2*(N−1) reference signaling (e.g., in the second step to obtain the second determined elements 315). As such, in accordance with the channel covariance matrix generation scheme 300-*c*, the communication device may measure 3N−2 reference signals. In some cases, in accordance with the channel covariance matrix generation scheme 300-*c*, the communication device may estimate $w_n^H R w_n$, for n=1, . . . N, and $w_k^H R w_{k+1}$, for k=1, . . . , N−1.

In a third step of the channel covariance matrix generation scheme 300-*a*, the channel covariance matrix generation scheme 300-*b*, and the channel covariance matrix generation scheme 300-*c*, the communication device may approximate the elements 320 of channel covariance matrix 305-*a*, channel covariance matrix 305-*b*, and channel covariance matrix 305-*c*, respectively. The first determined elements 310, the second determined elements 315, and the elements 320 may be referred to as upper triangular elements (e.g., may be located above (on the right side) of the primary diagonal of the channel covariance matrices 305). Accordingly, elements of the channel covariance matrices 305 located below (on the left side) of the primary diagonal may be referred to as lower triangular elements. In some examples, lower (off-diagonal) triangular elements of the channel covariance matrix 305-*a* may be complex conjugates of corresponding upper triangular elements. Accordingly, the communication device may determine the lower triangular elements based on the upper triangular elements (e.g., without measuring additional beams). The lower triangular elements may be referred to herein as the remaining elements.

In accordance with the channel covariance matrix generation scheme 300-*a*, the remaining elements may be approximated based on the first determined elements 310 and the second determined elements 315 of the channel covariance matrix 305-*a*. For example, the communication device may approximate the remaining elements of the channel covariance matrix 305-*a* via calculation based on (e.g., including) the values associated with the first determined elements 310 and the second determined elements 315 of the channel covariance matrix 305-*a*.

In accordance with the channel covariance matrix generation scheme 300-*b*, the communication device may approximate the remaining elements (e.g., associated with the terms $w_k^H R w_n$, where k≠k*) in accordance with the following Equation 15:

$$w_k^H R w_n \approx \frac{w_k^H R w_{k^*} * w_{k^*}^H R w_n}{w_{k^*}^H R w_{k^*}}. \tag{15}$$

In accordance with the channel covariance matrix generation scheme 300-*c*, the communication device may approximate the remaining elements (e.g., associated with the terms $w_k^H R w_n$, where n≥k+2) in accordance with the following Equation 16:

$$w_k^H R w_n = \frac{\prod_{i=k}^{n-1} w_i^H R w_{i+1}}{\prod_{i=k+1}^{n-1} w_i^H R w_i}. \tag{16}$$

Additionally, or alternatively, the communication device may determine the channel covariance matrix 305-*d* in accordance with the channel covariance matrix generation scheme 300-*d*. In some cases, the channel covariance matrix generation scheme 300-*d* may include zeroing out (e.g., setting to zero) one or more elements of the channel covariance matrix 305-*d* instead of determining or approximating the one or more elements. For example, the communication device may generate the channel covariance matrix 305-*d* using a portion of the subset of beams (e.g., a portion of the linear combinations of the set of beams, for example $w_1$, $w_2$, $w_4$, $w_1+w_2$, $w_1+iw_2$, $w_1+w_4$, $w_1+iw_4$, $w_2+w_4$, $w_2+iw_4$). The communication device may zero out the elements of the channel covariance matrix 305-*d* associated with beams that are not included within the portion (e.g., beams other than $w_1$, $w_2$, $w_4$, $w_1+w_2$, $w_1+iw_2$, $w_1+w_4$, $w_1+iw_4$, $w_2+w_4$, $w_2+iw_4$). As such, the channel covariance matrix 305-*d* may correspond to a low complexity approximation or relatively low rank approximation (or both) of a channel covariance matrix.

The communication device may decrease the latency of determining channel covariance matrices by employing one or more of the channel covariance matrix generation schemes 300. For example, the communication device may determine the channel covariance matrices 305 via a quantity of reference signals (e.g., SSBs, CSI-RSs) that is less than the quantity of elements of the channel covariance matrices 305 (e.g., may determine the channel covariance matrices 305 via 10 SSBs instead of 16 SSBs). Although the channel covariance matrices 305 are illustrated in the example of FIG. 3 with 4 rows and 4 columns, the channel covariance matrix generation schemes 300 may be applied to channel covariance matrices of multiple sizes (e.g., any size, including 8 rows and 8 columns or 2 rows and 6 columns).

Figure 4:
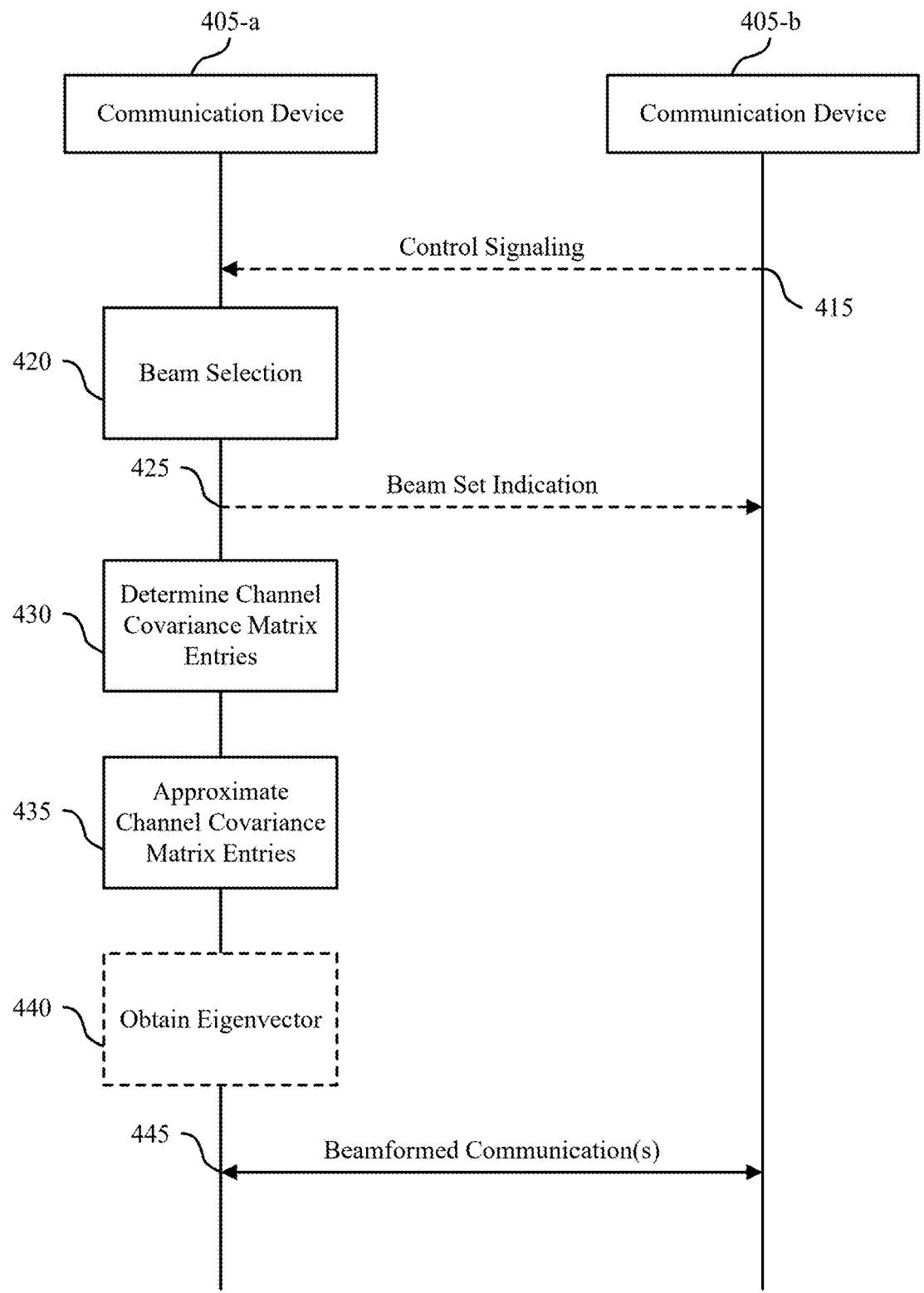
FIG. 4 shows an example of a process flow that supports techniques for speedy determination of adaptive beam weights in accordance with various aspects of the present disclosure.

FIG. 4 shows an example of a process flow 400 that supports techniques for speedy determination of adaptive beam weights in accordance with various aspects of the present disclosure. In some cases, aspects of the process flow 400 may implement or be implemented by aspects of FIGS. 1-3. For example, the process flow 400 may include a communication device 405-*a* and a communication device 405-*b*, which may each be an example of the UE 115 (e.g., as shown in FIG. 1), the network entity 105 (e.g., as shown in FIG. 1), or another communication device illustrated by and described with reference to FIGS. 1-3. In some cases, the communication device 405-*a* may generate a channel covariance matrix based on control signaling received from the communication device 405-*b*, a channel covariance matrix generation scheme, or both, and may communicate beamformed communications with the communication device 405-*b* based on the generated channel covariance matrix. The communication devices 405 may support a framework for selecting a subset of beams from a set of beams for generating a channel covariance matrix.

In the following description of process flow 400, the operations may be performed in a different order than the order shown, or other operations may be added or removed from the process flow 400. Some operations may also be omitted from the process flow 400, may be performed in different orders or at different times than shown, or other operations may be added to process flow 400. Although the communication device 405-*a* and the communication device 405-*b* are shown performing the operations of process flow 400, some aspects of some operations may also be performed by one or more other communication device.

In some examples, at 415, the communication device 405-*a* may receive control signaling including an indication of a scheme for determining a subset of elements of a channel covariance matrix. The scheme may be an example of the channel covariance matrix generation scheme 300 (as shown in FIG. 3) and the channel covariance matrix may be an example of the channel covariance matrices 305 (as shown in FIG. 3). In some cases, the scheme may utilize a subset of beams (e.g., beam as described herein with reference to FIGS. 2 and 3, measurement beams, sampling beams) selected from a set of beams. Additionally, the communication device 405-*a* may determine the subset of elements of the channel covariance matrix in accordance with the scheme.

In some cases, the control signaling may also include an indication of the set of beams, such that the communication device 405-*a* may select the set of beams based on (e.g., in accordance with) the control signaling. For example, the communication device 405-*b* may transmit the control signaling including the indication of the set of beams based on determining a set of measurement beams for the communication device 405-*a*, where the determining may be based on one or more tradeoffs associated with the set of beams, such as one or more tradeoffs described with reference to FIG. 3.

At 420, the communication device 405-*a* may select the set of beams from multiple sets of beams. In some cases, the communication device 405-*a* may select the set of beams based on the set of beams satisfying a condition. For example, the condition may include a mean squared error condition for a mean squared error associated with the set of beams, a gain condition for an array gain associated with the set of beams, an amplitude control threshold for a range of amplitudes associated with the set of beams, or a memory threshold associated with storage of the set of beams in a RFIC chip memory for a number (e.g., quantity) of beams included in the set of beams.

Additionally, or alternatively, the communication device 405-*a* may select the set of beams from the multiple sets of beams based on a number (e.g., quantity) of antenna elements associated with the set of beams satisfying a threshold number of antenna elements. For example, if the set of antenna elements associated with a set of beams of the multiple sets of beams is larger than a number of antenna elements of the communication device 405-*a*, the communication device 405-*a* may not select the set of beams.

The communication device 405-*a* may also select a subset of beams from the set of beams for beamformed communication. For example, the communication device 405-*a* may select the subset of beams from the set of beams based on the scheme, as described herein with respect to FIG. 3. In some cases, each beam of the selected subset of beams may be a linear combination of at least one beam of the set of beams. Additionally, the number of beams of the selected subset of beams may be less than a number of elements of the channel covariance matrix In some examples, at 425, the communication device 405-*a* may transmit, to the communication device 405-*b*, control signaling that may include an indication of the set of beams (e.g., a beam set indication). For example, the communication device 405-*b* may be a network entity and the communication device 405-*a* may transmit the control signaling that indicates (or requests) the set of beams. In response, the communication device 405-*a* may receive UE assistance information (UAI) from the communication device 405-*b* that configures the communication device 405-*a* with the set of beams. Additionally, or alternatively, the communication device 405-*b* may be an example of a UE and the communication device 405-*a* may transmit the control signaling via one or more sidelink messages that indicates the set of beams (which may lead to more consistent measurements across the communication devices 405).

At 430, the communication device 405-*a* may determine a subset of elements of the channel covariance matrix (e.g., such as the first determined elements 310 and the second determined elements 315 of FIG. 3) based on signal strength measurements (e.g., RSRP measurements) or phase measurements associated with receiving one or more reference signals via the selected subset of beams. For example, the communication device 405-*a* may receive (e.g., and measure) the reference signals (e.g., the beams for receiving the reference signals) according to the scheme, as described herein with respect to FIG. 3. In some cases, the communication device 405-*a* may receive the one or more reference signals, before, during, or after determining one or more elements of the subset of elements at 430. For example, the communication device 405-*a* may receive one or more reference via a first number of beams of the subset of beams. The communication device 405-*a* may then determine a first number of elements of the subset of elements based on measuring the one or more reference signals received via the first number of beams of the subset of beams. Additionally, for example, after determining the first number of elements, the communication device 405-*a* may receive one or more other reference signals via a second number of beams of the subset of beams. The communication device 405-*a* may then determine a second number of elements of the subset of elements based on measuring the one or more other reference signals received via the second number of beams.

In other words, in a first step, the communication device 405-*a* may determine each element of the first number of elements of the subset of elements based on respective channel measurements associated with the first number of beams of the selected subset of beams. In some examples, each element of the first number of elements may be positioned along a primary diagonal of the channel covariance matrix, such as a primary diagonal illustrated by and described with reference to FIG. 3. Additionally, in a second step, the communication device 405-*a* may determine each element of the second number of elements of the subset of elements based on respective channel measurements associated with the second number of beams of the selected subset of beams.

In some examples, a first one or more elements of the second number of elements may be positioned along the same row as an element of the first number of elements, and a second one or more elements of the second number of elements may be positioned along the same column as the element. For example, the communication device 405-*a* may generate the channel covariance matrix in accordance with the channel covariance matrix generation scheme 300-*a* (as shown in FIG. 3). In such an example, the communication device 405-*a* may select the element based on the element having the highest associated signal strength in measurements among the first number of elements (e.g., the diagonal elements of the channel covariance matrix).

In some other example, each element of the second number of elements may be positioned along the same row or the same column as an element of the first number of elements. For example, the communication device 405-*a* may generate the channel covariance matrix in accordance with the channel covariance matrix generation scheme 300-*b* (as shown in FIG. 3). In such an example, the communication device 405-*a* may receive control signaling (e.g., from the communication device 405-*b*) including an indication of the element, and may select the element in accordance with the control signaling. Additionally, or alternatively, the communication device 405-*a* may select the element in accordance with a rule for covariance matrix element selection.

In some examples, each element of the second number of elements may be positioned along a secondary diagonal of the channel covariance matrix. For example, the communication device 405-*a* may generate (e.g., determine) the channel covariance matrix in accordance with the channel covariance matrix generation scheme 300-*c* (as shown in FIG. 3). In such an example, the second number of elements (e.g., in the secondary diagonal) may be less than the first number of elements.

In some other examples, the communication device 405-*a* may determine the second number of elements by setting each element of the second number of elements of the channel covariance matrix to zero (e.g., zero out the element). For example, the communication device 405-*a* may generate the channel covariance matrix in accordance with the channel covariance matrix generation scheme 300-*d* (as shown in FIG. 3). In some cases, setting the elements of the second number of elements to zero may generate a low complexity approximation or a relatively low rank approximation of the channel covariance matrix. As such, in some examples, the communication device 405-*a* may set each element of the second number of elements to zero based on operating in a low-power mode, with constrained processing capabilities, or to reduce processing time or power consumption associated with generating the channel covariance matrix.

At 435, the communication device 405-*a* may determine (e.g., approximate) one or more remaining elements (e.g., elements not included in the first subset of elements) of the channel covariance matrix based on one or more approximations using the determined subset of elements of the channel covariance matrix. That is, the communication device may approximate one or more remaining elements (e.g., lower triangular elements), which may be examples of remaining elements illustrated by and describe with respect to FIG. 3. The communication device 405-*a* may obtain the approximation based on determining the first number of elements of the channel covariance matrix, determining the second number of elements of the channel covariance matrix, or both.

For example, the communication device 405-*a* may determine the remaining elements based on one or more computations that use the determined subset of elements, where each element of the determined remaining elements may be an off-diagonal (lower triangular) element of the channel covariance matrix. In some cases, the one or more computations may be based on the channel covariance matrix being associated with a single subcarrier, and the beamformed communication may be performed via multiple subcarriers. In other words, approximations of non-estimated off-diagonal entries may be based on an assumption of single subcarrier communication, but may be applied to multiple subcarrier communication use cases. Additionally, or alternatively, a respective value of each element of the remaining elements may be set to zero.

In some examples, at 440, the communication device 405-*a* may obtain an eigenvector of the channel covariance matrix based on the determined subset of elements and the determined remaining elements. In some cases, the obtained eigenvector may be associated with an eigenvalue having a highest absolute value among multiple eigenvectors of the channel covariance matrix (e.g., may be a dominant eigenvector of the channel covariance matrix). The communication device 405-*a* may determine a set of estimated beam weights for communication (e.g., beamformed communication) based on the obtained eigenvector.

At 445, the communication device 405-*a* may perform the beamformed communication via the determined set of estimated beam weights for communication. In some cases, the set of estimated beam weights may be based on the channel covariance matrix. In some cases, by determining the channel covariance matrix in accordance with one or more techniques for speedy determination of adaptive beam weights, as described herein, the communication device 405-*a* may experience less latency, among other benefits.

Figure 5:
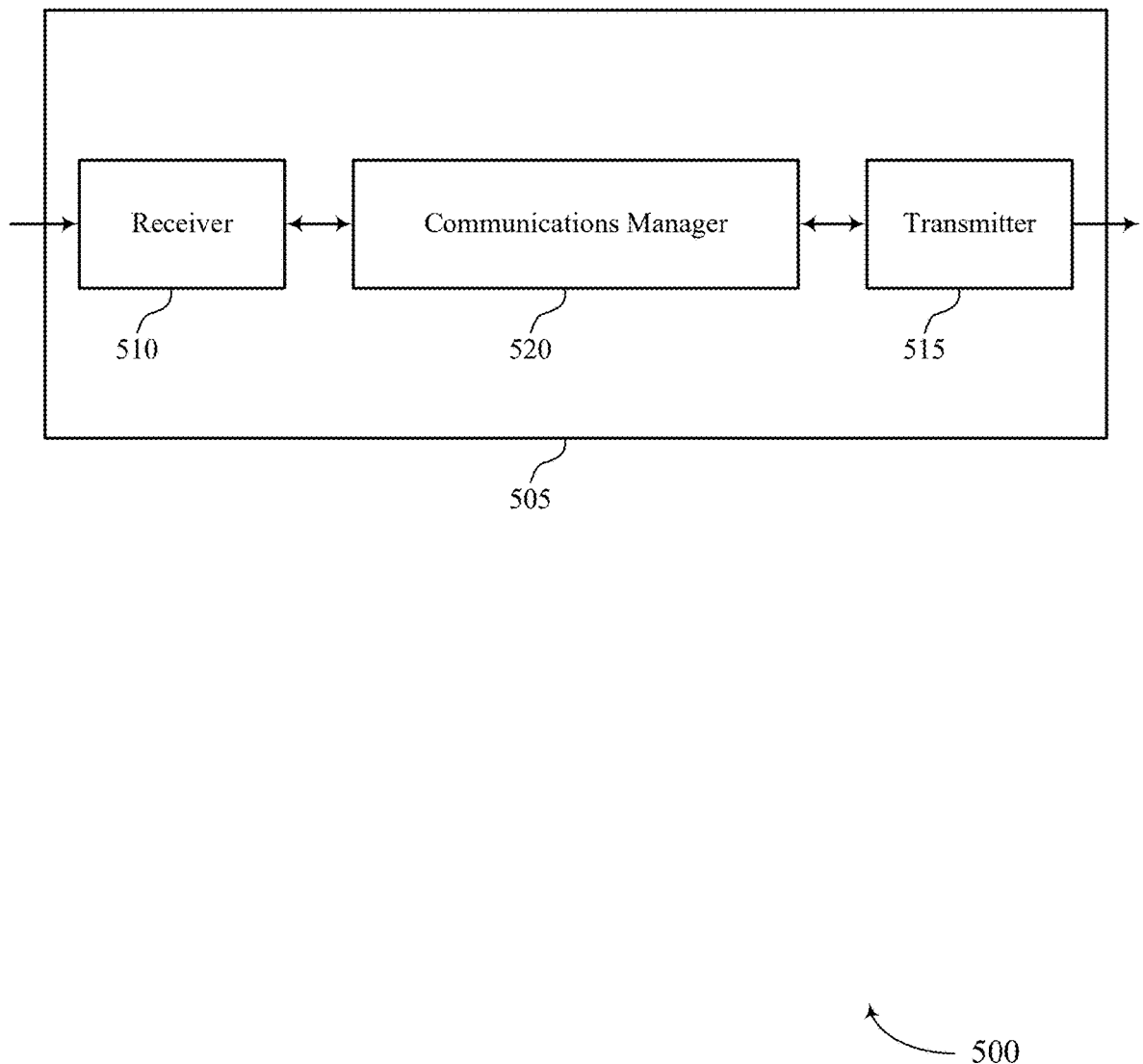
FIGS. 5 and 6 show block diagrams of devices that support techniques for speedy determination of adaptive beam weights in accordance with various aspects of the present disclosure.

FIG. 5 shows a block diagram 500 of a device 505 that supports techniques for speedy determination of adaptive beam weights in accordance with various aspects of the present disclosure. The device 505 may be an example of aspects of a UE 115 or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for speedy determination of adaptive beam weights). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for speedy determination of adaptive beam weights). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for speedy determination of adaptive beam weights as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for selecting a subset of measurement beams from a set of measurement beams for beamformed communication. The communications manager 520 is capable of, configured to, or operable to support a means for determining a subset of elements of a channel covariance matrix based on signal strength or phase measurements associated with the selected subset of measurement beams, where a number of measurement beams of the selected subset of measurement beams is less than a number of elements of the channel covariance matrix. The communications manager 520 is capable of, configured to, or operable to support a means for determining remaining elements of the channel covariance matrix based on one or more approximations using the determined subset of elements of the channel covariance matrix. The communications manager 520 is capable of, configured to, or operable to support a means for performing the beamformed communication via a set of estimated beam weights for communication, where the set of estimated beam weights is based on the channel covariance matrix.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing and more efficient utilization of communication resources. For example, a communication device that implements the techniques of the present disclosure may measure less beams (e.g., reference signals) to generate a channel covariance matrix. Thus, the device may experience reduced processing and utilize less communication resources in the generation of channel covariance matrices.

Figure 6:
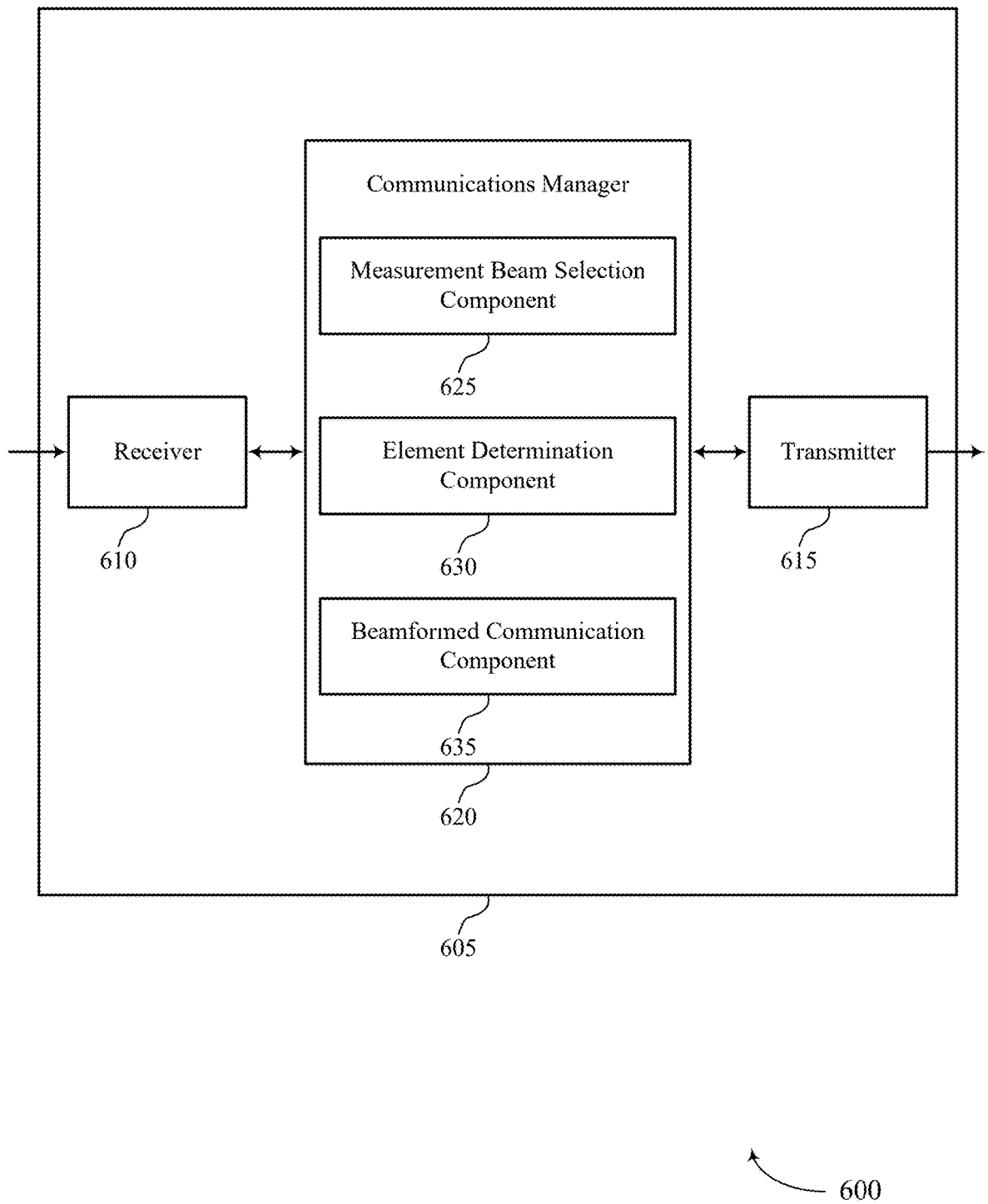

FIG. 6 shows a block diagram 600 of a device 605 that supports techniques for speedy determination of adaptive beam weights in accordance with various aspects of the present disclosure. The device 605 may be an example of aspects of a device 505, a UE 115, or a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for speedy determination of adaptive beam weights). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for speedy determination of adaptive beam weights). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for speedy determination of adaptive beam weights as described herein. For example, the communications manager 620 may include a measurement beam selection component 625, an element determination component 630, a beamformed communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The measurement beam selection component 625 is capable of, configured to, or operable to support a means for selecting a subset of measurement beams from a set of measurement beams for beamformed communication. The element determination component 630 is capable of, configured to, or operable to support a means for determining a subset of elements of a channel covariance matrix based on signal strength or phase measurements associated with the selected subset of measurement beams, where a number of measurement beams of the selected subset of measurement beams is less than a number of elements of the channel covariance matrix. The element determination component 630 is capable of, configured to, or operable to support a means for determining remaining elements of the channel covariance matrix based on one or more approximations using the determined subset of elements of the channel covariance matrix. The beamformed communication component 635 is capable of, configured to, or operable to support a means for performing the beamformed communication via a set of estimated beam weights for communication, where the set of estimated beam weights is based on the channel covariance matrix.

Figure 7:
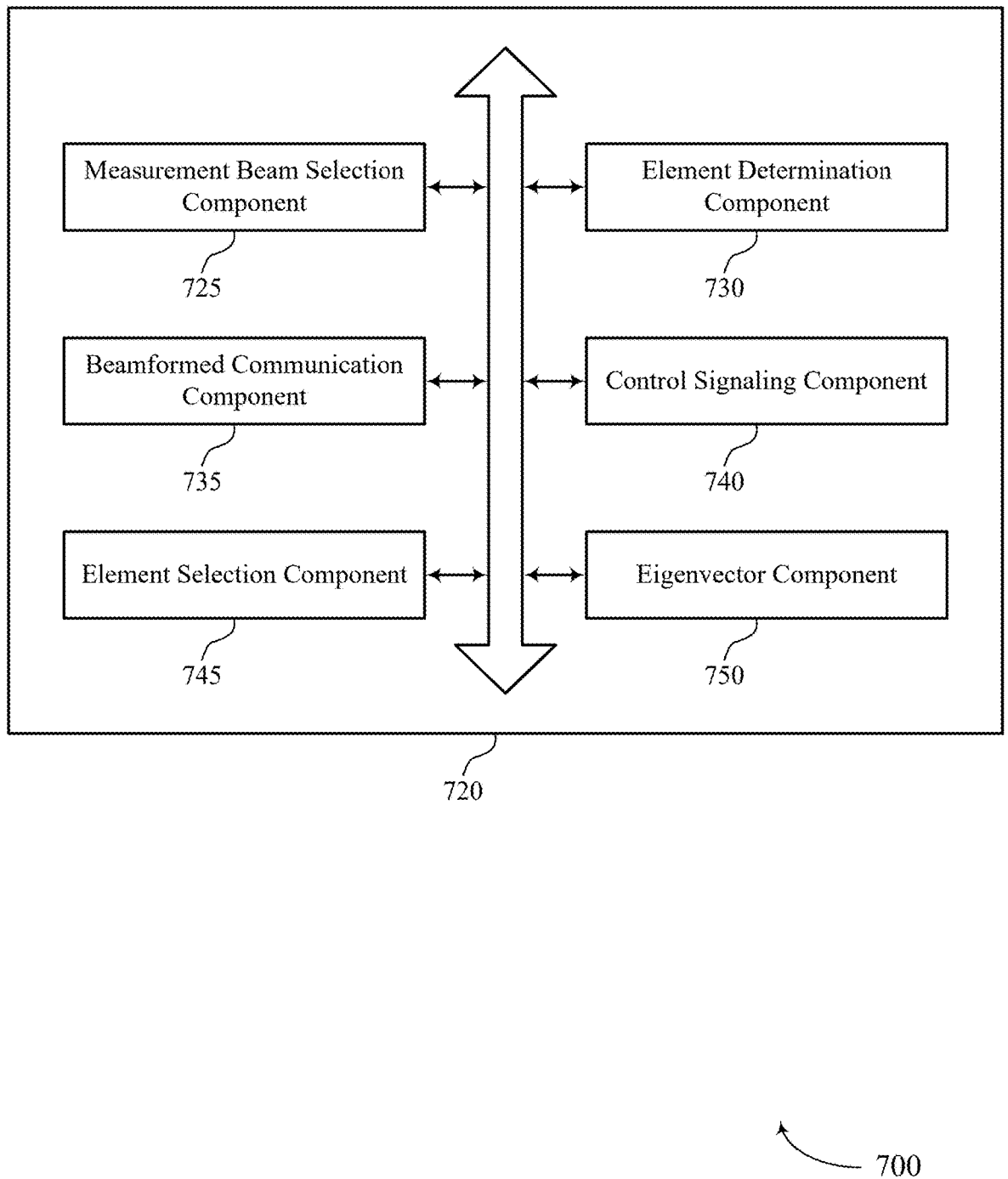
FIG. 7 shows a block diagram of communications manager that supports techniques for speedy determination of adaptive beam weights in accordance with various aspects of the present disclosure.

FIG. 7 shows a block diagram 700 of a communications manager 720 that supports techniques for speedy determination of adaptive beam weights in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for speedy determination of adaptive beam weights as described herein. For example, the communications manager 720 may include a measurement beam selection component 725, an element determination component 730, a beamformed communication component 735, a control signaling component 740, an element selection component 745, an eigenvector component 750, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication in accordance with examples as disclosed herein. The measurement beam selection component 725 is capable of, configured to, or operable to support a means for selecting a subset of measurement beams from a set of measurement beams for beamformed communication. The element determination component 730 is capable of, configured to, or operable to support a means for determining a subset of elements of a channel covariance matrix based on signal strength or phase measurements associated with the selected subset of measurement beams, where a number of measurement beams of the selected subset of measurement beams is less than a number of elements of the channel covariance matrix. In some examples, the element determination component 730 is capable of, configured to, or operable to support a means for determining remaining elements of the channel covariance matrix based on one or more approximations using the determined subset of elements of the channel covariance matrix. The beamformed communication component 735 is capable of, configured to, or operable to support a means for performing the beamformed communication via a set of estimated beam weights for communication, where the set of estimated beam weights is based on the channel covariance matrix.

In some examples, to support determining the subset of elements of the channel covariance matrix, the element determination component 730 is capable of, configured to, or operable to support a means for determining each element of a first number of elements of the subset of elements based on respective channel measurements associated with a first number of measurement beams of the selected subset of measurement beams, where each element of the first number of elements is positioned along a primary diagonal of the channel covariance matrix. In some examples, to support determining the subset of elements of the channel covariance matrix, the element determination component 730 is capable of, configured to, or operable to support a means for determining each element of a second number of elements of the subset of elements based on respective channel measurements associated with a second number of measurement beams of the selected subset of measurement beams, where a first one or more elements of the second number of elements are positioned along the same row as an element of the first number of elements, and where a second one or more elements of the second number of elements are positioned along the same column as the element.

In some examples, the element selection component 745 is capable of, configured to, or operable to support a means for selecting the element based on the element having a highest associated signal strength in measurements among the first number of elements.

In some examples, to support determining the subset of elements of the channel covariance matrix, the element determination component 730 is capable of, configured to, or operable to support a means for determining each element of a first number of elements of the subset of elements based on respective channel measurements associated with a first number of measurement beams of the selected subset of measurement beams, where each element of the first number of elements is positioned along a primary diagonal of the channel covariance matrix. In some examples, to support determining the subset of elements of the channel covariance matrix, the element determination component 730 is capable of, configured to, or operable to support a means for determining each element of a second number of elements of the subset of elements based on respective channel measurements associated with a second number of measurement beams of the selected subset of measurement beams, where each element of the second number of elements is positioned along the same row or the same column as an element of the first number of elements.

In some examples, the control signaling component 740 is capable of, configured to, or operable to support a means for receiving control signaling including an indication of the element. In some examples, the element selection component 745 is capable of, configured to, or operable to support a means for selecting the element in accordance with the control signaling. In some examples, the element selection component 745 is capable of, configured to, or operable to support a means for selecting the element in accordance with a rule for covariance matrix element selection.

In some examples, to support determining the subset of elements of the channel covariance matrix, the element determination component 730 is capable of, configured to, or operable to support a means for determining each element of a first number of elements of the subset of elements based on respective channel measurements associated with a first number of measurement beams of the selected subset of measurement beams, where each element of the first number of elements is positioned along a primary diagonal of the channel covariance matrix. In some examples, to support determining the subset of elements of the channel covariance matrix, the element determination component 730 is capable of, configured to, or operable to support a means for determining each element of a second number of elements of the subset of elements based on respective channel measurements associated with a second number of measurement beams of the selected subset of measurement beams, where each element of the second number of elements is positioned along a secondary diagonal of the channel covariance matrix, and where the second number of elements is less than the first number of elements.

In some examples, the control signaling component 740 is capable of, configured to, or operable to support a means for receiving control signaling including an indication of a scheme for determining the subset of elements of the channel covariance matrix using the selected subset of measurement beams, where determining the subset of elements of the channel covariance matrix is in accordance with the scheme.

In some examples, to support determining the remaining elements of the channel covariance matrix, the element determination component 730 is capable of, configured to, or operable to support a means for determining the remaining elements based on one or more computations using the determined subset of elements, where each element of the determined remaining elements includes an off-diagonal element of the channel covariance matrix.

In some examples, the eigenvector component 750 is capable of, configured to, or operable to support a means for obtaining an eigenvector of the channel covariance matrix based on the determined subset of elements and the determined remaining elements, where the obtained eigenvector is associated with an eigenvalue having a highest absolute value among eigenvectors of the channel covariance matrix, and where the set of estimated beam weights for communication is based on the obtained eigenvector. In some examples, the one or more computations are based on the channel covariance matrix being associated with a single subcarrier. In some examples, the beamformed communication is performed via a set of multiple subcarriers.

In some examples, to support determining the remaining elements of the channel covariance matrix, the element determination component 730 is capable of, configured to, or operable to support a means for setting a respective value of each element of the remaining elements to zero. In some examples, the measurement beam selection component 725 is capable of, configured to, or operable to support a means for selecting the set of measurement beams from a set of multiple sets of measurement beams based on the set of measurement beams satisfying a condition.

In some examples, a mean squared error associated with the set of measurement beams satisfying a mean squared error condition. In some examples, an array gain associated with the set of measurement beams satisfying a gain condition. In some examples, a range of amplitudes associated with the set of measurement beams satisfying an amplitude control threshold. In some examples, a number of measurement beams included in the set of measurement beams satisfying a memory threshold associated with storage of the set of measurement beams in a RFIC chip memory.

In some examples, the control signaling component 740 is capable of, configured to, or operable to support a means for receiving, from a second device, control signaling including an indication of the set of measurement beams, where the set of measurement beams is selected in accordance with the control signaling.

In some examples, the device includes a UE and the second device includes another UE or a network entity. In some examples, the control signaling component 740 is capable of, configured to, or operable to support a means for transmitting, to a second device, control signaling including an indication of the set of measurement beams.

In some examples, the set of measurement beams is associated with a number of antenna elements. In some examples, the set of measurement beams is selected from the set of multiple sets of measurement beams based on the number of antenna elements satisfying a threshold. In some examples, each beam of the selected subset of measurement beams includes a linear combination of at least one beam of the set of measurement beams.

Figure 8:
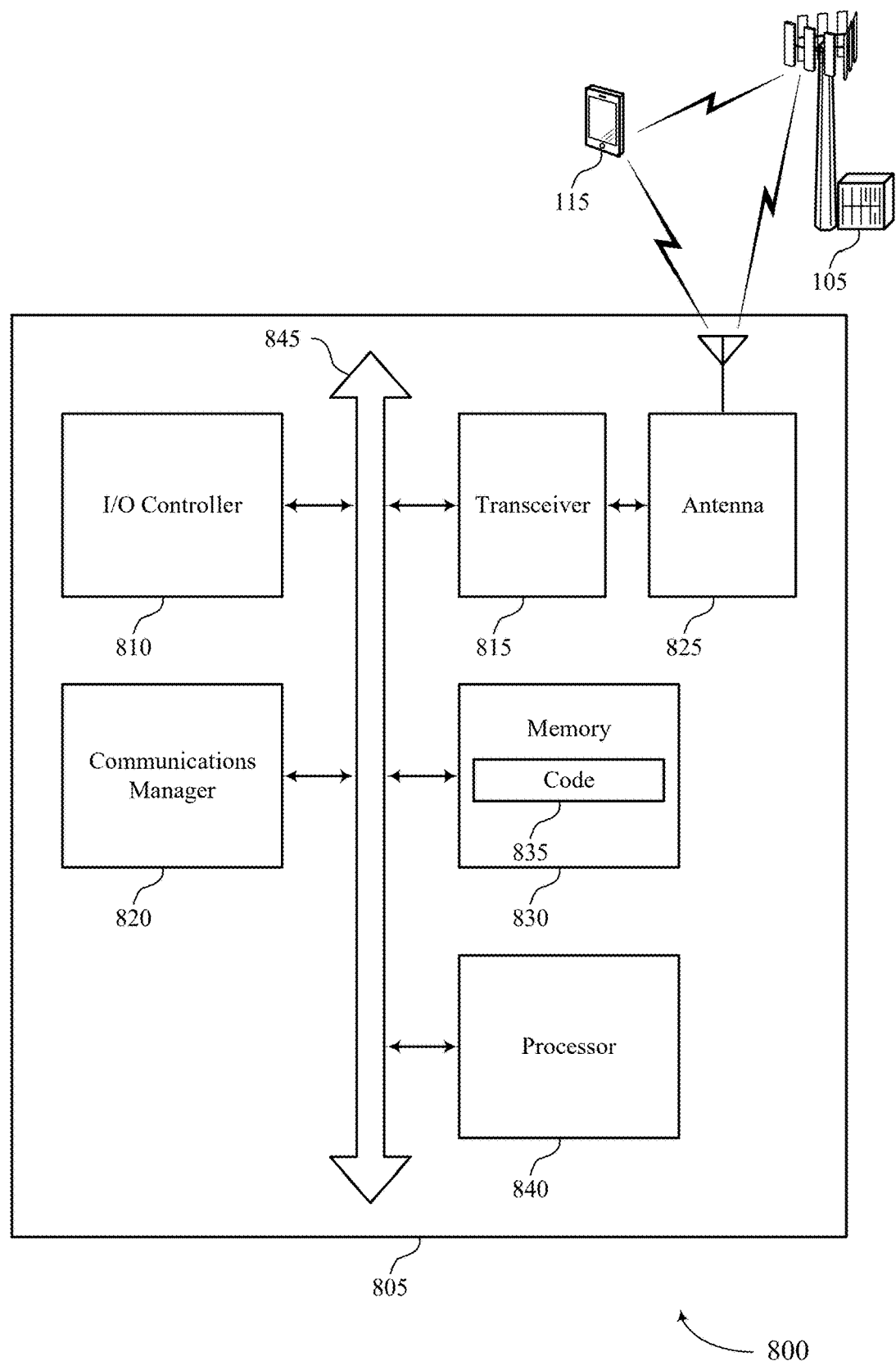
FIG. 8 shows a diagram of a system including devices that supports techniques for speedy determination of adaptive beam weights in accordance with various aspects of the present disclosure.

FIG. 8 shows a diagram of a system 800 including a device 805 that supports techniques for speedy determination of adaptive beam weights in accordance with various aspects of the present disclosure. The device 805 may be an example of or include the components of a device 505, a device 605, or a UE 115 as described herein. The device 805 may communicate (e.g., wirelessly) with one or more of the network entities 105, one or more of the UEs 115, or any combination thereof. The device 805 may include components for bi-directional voice and data communications including components for transmitting and receiving communications, such as a communications manager 820, an input/output (I/O) controller, such as an I/O controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a (e.g., single) antenna 825. However, in some other cases, the device 805 may have more than one of the antenna 825, which may be capable of concurrently transmitting or receiving multiple wireless transmissions. The transceiver 815 may communicate bi-directionally, via the one or more of the antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more of the antennas 825 for transmission, and to demodulate packets received from the one or more of the antennas 825. The transceiver 815, or the transceiver 815 and one or more of the antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store code 835 (e.g., computer-readable, computer-executable code) including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for speedy determination of adaptive beam weights). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for selecting a subset of measurement beams from a set of measurement beams for beamformed communication. The communications manager 820 is capable of, configured to, or operable to support a means for determining a subset of elements of a channel covariance matrix based on signal strength or phase measurements associated with the selected subset of measurement beams, where a number of measurement beams of the selected subset of measurement beams is less than a number of elements of the channel covariance matrix. The communications manager 820 is capable of, configured to, or operable to support a means for determining remaining elements of the channel covariance matrix based on one or more approximations using the determined subset of elements of the channel covariance matrix. The communications manager 820 is capable of, configured to, or operable to support a means for performing the beamformed communication via a set of estimated beam weights for communication, where the set of estimated beam weights is based on the channel covariance matrix.

By including or configuring the communications manager 820 in accordance with examples as described herein, the device 805 may support techniques for improved communication reliability and reduced latency. For example, a communication device (e.g., a UE) that implements the techniques of the present disclosure may perform less measurements in generating a channel covariance matrix, and may generate improved beams. Thus, the device may experience less latency in generating the improved beams, and may experience more reliable communication via the improved beam.

In some examples, the communications manager 820 may be configured to perform various operations (e.g., receiving, monitoring, transmitting) using or otherwise in cooperation with the transceiver 815, the one or more of the antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for speedy determination of adaptive beam weights as described herein, or the at least one processor 840 and the at least one memory 830 may be otherwise configured to, individually or collectively, perform or support such operations.

Figure 9:
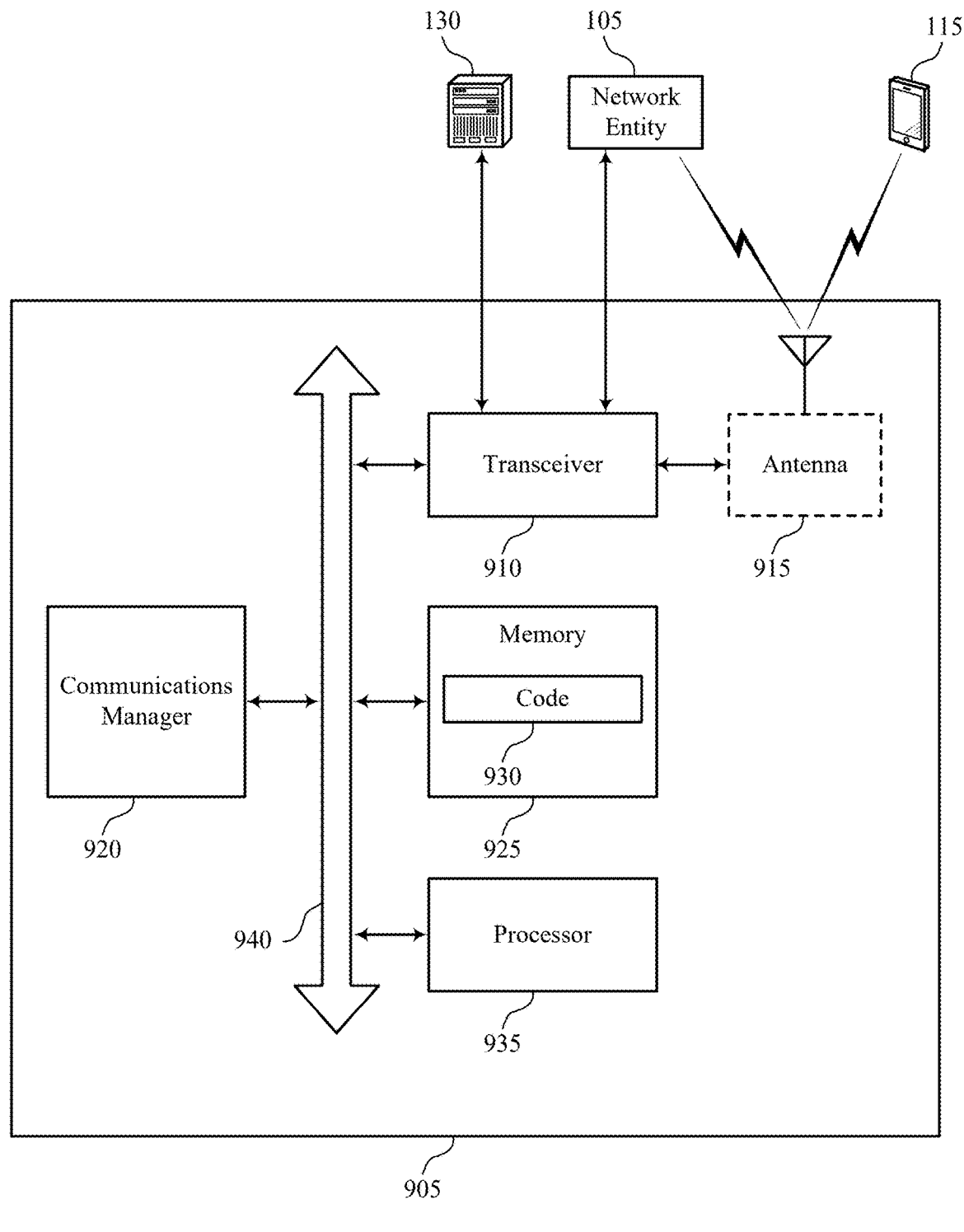
FIG. 9 shows a diagram of a system including a device that supports techniques for speedy determination of adaptive beam weights in accordance with various aspects of the present disclosure.

FIG. 9 shows a diagram of a system 900 including a device 905 that supports techniques for speedy determination of adaptive beam weights in accordance with various aspects of the present disclosure. The device 905 may be an example of or include the components of a device 505, a device 605, or a network entity 105 as described herein. The device 905 may communicate with one or more of the network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more of antennas 915, which may be capable of transmitting or receiving wireless transmissions (e.g., concurrently). The transceiver 910 may also include a modem to modulate signals, to provide the modulated signals for transmission (e.g., by one or more of the antennas 915, by a wired transmitter), to receive modulated signals (e.g., from one or more of the antennas 915, from a wired receiver), and to demodulate signals. In some implementations, the transceiver 910 may include one or more interfaces, such as one or more interfaces coupled with the one or more of the antennas 915 that are configured to support various receiving or obtaining operations, or one or more interfaces coupled with the one or more of the antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more of the antennas 915, or the transceiver 910 and the one or more of the antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via communications links (e.g., a communication link 125, a backhaul communication link 120, a midhaul communication link 162, a fronthaul communication link 168).

The at least one memory 925 may include RAM, ROM, or any combination thereof. The at least one memory 925 may store code 930 (e.g., computer-readable, computer-executable code) including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting techniques for speedy determination of adaptive beam weights). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. As such, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with one or more other of the network entities 105, and may include a controller or scheduler for controlling communications with UEs 115 in cooperation with one or more other of the network entities 105. In some examples, the communications manager 920 may support an X2 interface within an LTE/LTE-A wireless communications network technology to provide communication between network entities 105.

The communications manager 920 may support wireless communication in accordance with examples as disclosed herein. For example, the communications manager 920 is capable of, configured to, or operable to support a means for selecting a subset of measurement beams from a set of measurement beams for beamformed communication. The communications manager 920 is capable of, configured to, or operable to support a means for determining a subset of elements of a channel covariance matrix based on signal strength or phase measurements associated with the selected subset of measurement beams, where a number of measurement beams of the selected subset of measurement beams is less than a number of elements of the channel covariance matrix. The communications manager 920 is capable of, configured to, or operable to support a means for determining remaining elements of the channel covariance matrix based on one or more approximations using the determined subset of elements of the channel covariance matrix. The communications manager 920 is capable of, configured to, or operable to support a means for performing the beamformed communication via a set of estimated beam weights for communication, where the set of estimated beam weights is based on the channel covariance matrix.

By including or configuring the communications manager 920 in accordance with examples as described herein, the device 905 may support techniques for improved communication reliability and reduced latency. For example, a communication device (e.g., a network entity) that implements the techniques of the present disclosure may perform less measurements in generating a channel covariance matrix, and may generate improved beams. Thus, the device may experience less latency in generating the improved beams, and may experience more reliable communication via the improved beam.

In some examples, the communications manager 920 may be configured to perform various operations (e.g., receiving, obtaining, monitoring, outputting, transmitting) using or otherwise in cooperation with the transceiver 910, the one or more of the antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of techniques for speedy determination of adaptive beam weights as described herein, or the at least one processor 935 and the at least one memory 925 may be otherwise configured to, individually or collectively, perform or support such operations.

Figure 10:
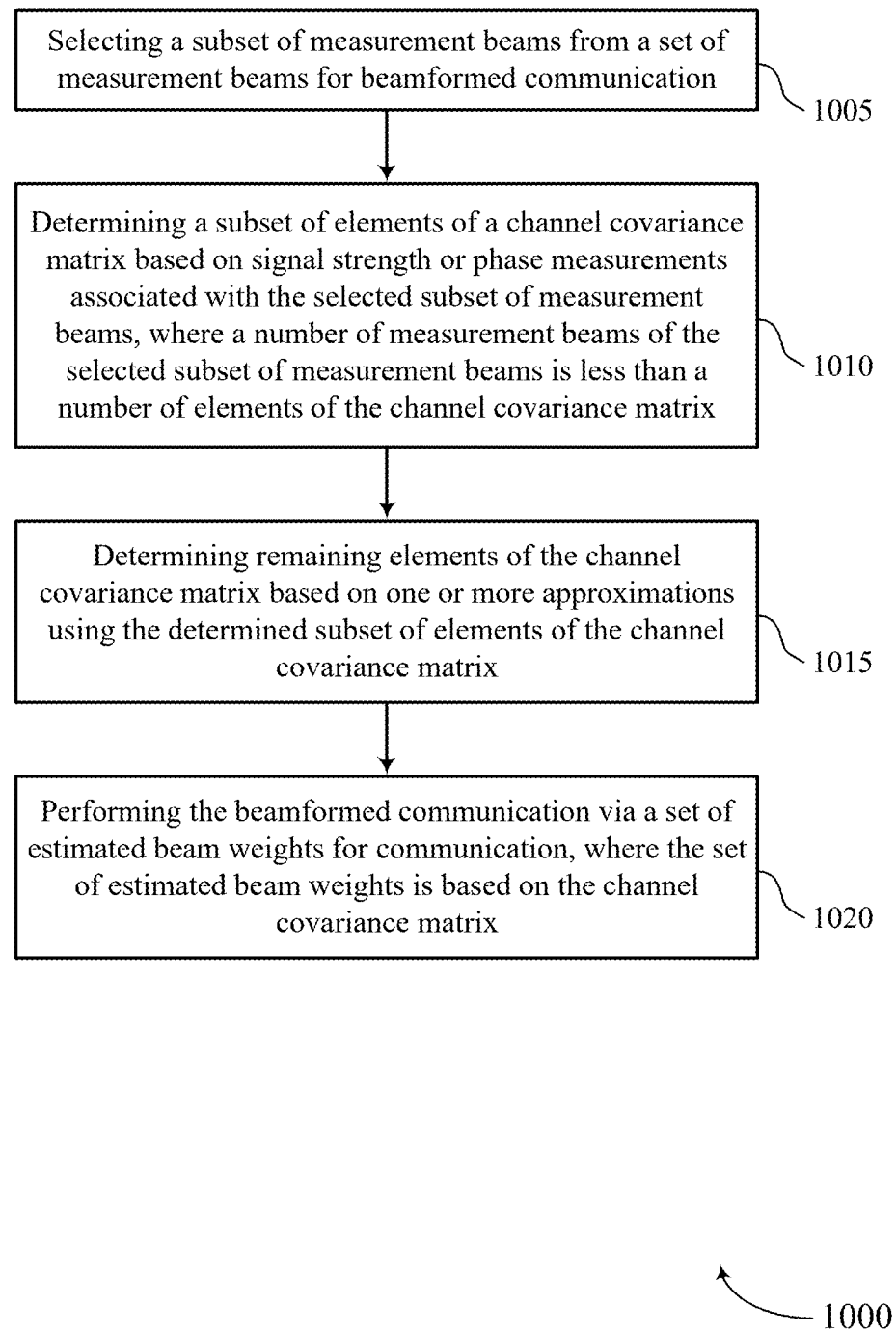
FIGS. 10 through 12 show flowcharts illustrating methods that support techniques for speedy determination of adaptive beam weights in accordance with various aspects of the present disclosure.

FIG. 10 shows a flowchart illustrating a method 1000 that supports techniques for speedy determination of adaptive beam weights in accordance with various aspects of the present disclosure. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include selecting a subset of measurement beams from a set of measurement beams for beamformed communication. The operations of block 1005 may be performed in accordance with examples as disclosed herein. In some examples, aspects of the operations of 1005 may be performed by a measurement beam selection component 725 (e.g., as shown in FIG. 7).

At 1010, the method may include determining a subset of elements of a channel covariance matrix based on signal strength or phase measurements associated with the selected subset of measurement beams, where a number of measurement beams of the selected subset of measurement beams is less than a number of elements of the channel covariance matrix. The operations of block 1010 may be performed in accordance with examples as disclosed herein. In some examples, aspects of the operations of 1010 may be performed by an element determination component 730 (e.g., as shown in FIG. 7).

At 1015, the method may include determining remaining elements of the channel covariance matrix based on one or more approximations using the determined subset of elements of the channel covariance matrix. The operations of block 1015 may be performed in accordance with examples as disclosed herein. In some examples, aspects of the operations of 1015 may be performed by an element determination component 730 (e.g., as shown in FIG. 7).

At 1020, the method may include performing the beamformed communication via a set of estimated beam weights for communication, where the set of estimated beam weights is based on the channel covariance matrix. The operations of block 1020 may be performed in accordance with examples as disclosed herein. In some examples, aspects of the operations of 1020 may be performed by a beamformed communication component 735 (e.g., as shown in FIG. 7).

Figure 11:
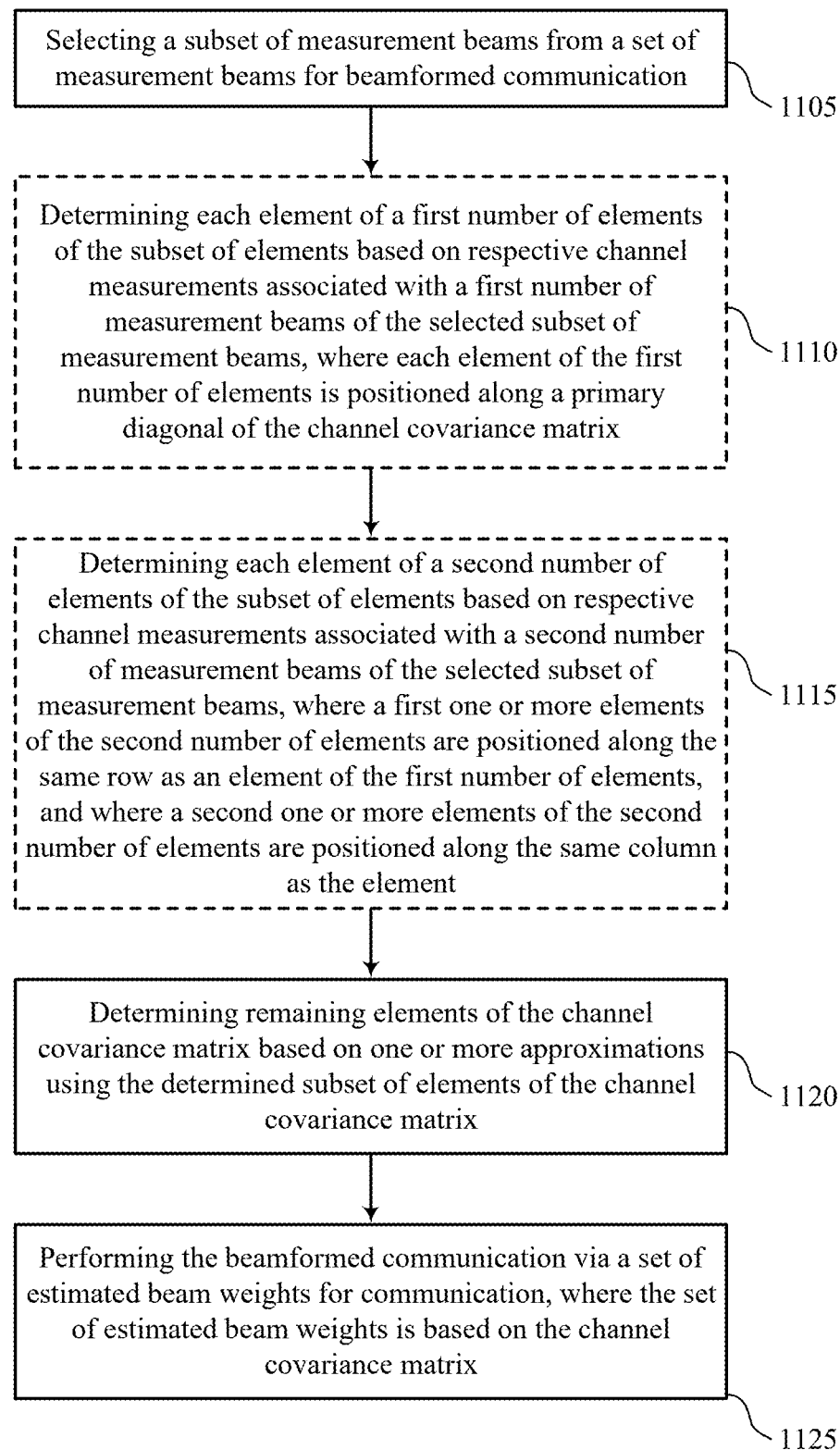

FIG. 11 shows a flowchart illustrating a method 1100 that supports techniques for speedy determination of adaptive beam weights in accordance with various aspects of the present disclosure. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions.

Additionally, or alternatively, the UE or the network entity may perform aspects of the described functions using special-purpose hardware.

At 1105, the method may include selecting a subset of measurement beams from a set of measurement beams for beamformed communication. The operations of block 1105 may be performed in accordance with examples as disclosed herein. In some examples, aspects of the operations of 1105 may be performed by a measurement beam selection component 725 (e.g., as shown in FIG. 7).

At 1110, the method may include determining a subset of elements of a channel covariance matrix based on signal strength or phase measurements associated with the selected subset of measurement beams, where a number of measurement beams of the selected subset of measurement beams is less than a number of elements of the channel covariance matrix. The operations of block 1110 may be performed in accordance with examples as disclosed herein. In some examples, aspects of the operations of 1110 may be performed by an element determination component 730 as described with reference to FIG. 7.

At 1115, the method may include determining each element of a first number of elements of the subset of elements based on respective channel measurements associated with a first number of measurement beams of the selected subset of measurement beams, where each element of the first number of elements is positioned along a primary diagonal of the channel covariance matrix. The operations of block 1115 may be performed in accordance with examples as disclosed herein. In some examples, aspects of the operations of 1115 may be performed by an element determination component 730 (e.g., as shown in FIG. 7).

At 1120, the method may include determining each element of a second number of elements of the subset of elements based on respective channel measurements associated with a second number of measurement beams of the selected subset of measurement beams, where a first one or more elements of the second number of elements are positioned along the same row as an element of the first number of elements, and where a second one or more elements of the second number of elements are positioned along the same column as the element. The operations of block 1120 may be performed in accordance with examples as disclosed herein. In some examples, aspects of the operations of 1120 may be performed by an element determination component 730 (e.g., as shown in FIG. 7).

At 1125, the method may include determining remaining elements of the channel covariance matrix based on one or more approximations using the determined subset of elements of the channel covariance matrix. The operations of block 1125 may be performed in accordance with examples as disclosed herein. In some examples, aspects of the operations of 1125 may be performed by an element determination component 730 (e.g., as shown in FIG. 7).

At 1130, the method may include performing the beamformed communication via a set of estimated beam weights for communication, where the set of estimated beam weights is based on the channel covariance matrix. The operations of block 1130 may be performed in accordance with examples as disclosed herein. In some examples, aspects of the operations of 1130 may be performed by a beamformed communication component 735 (e.g., as shown in FIG. 7).

Figure 12:
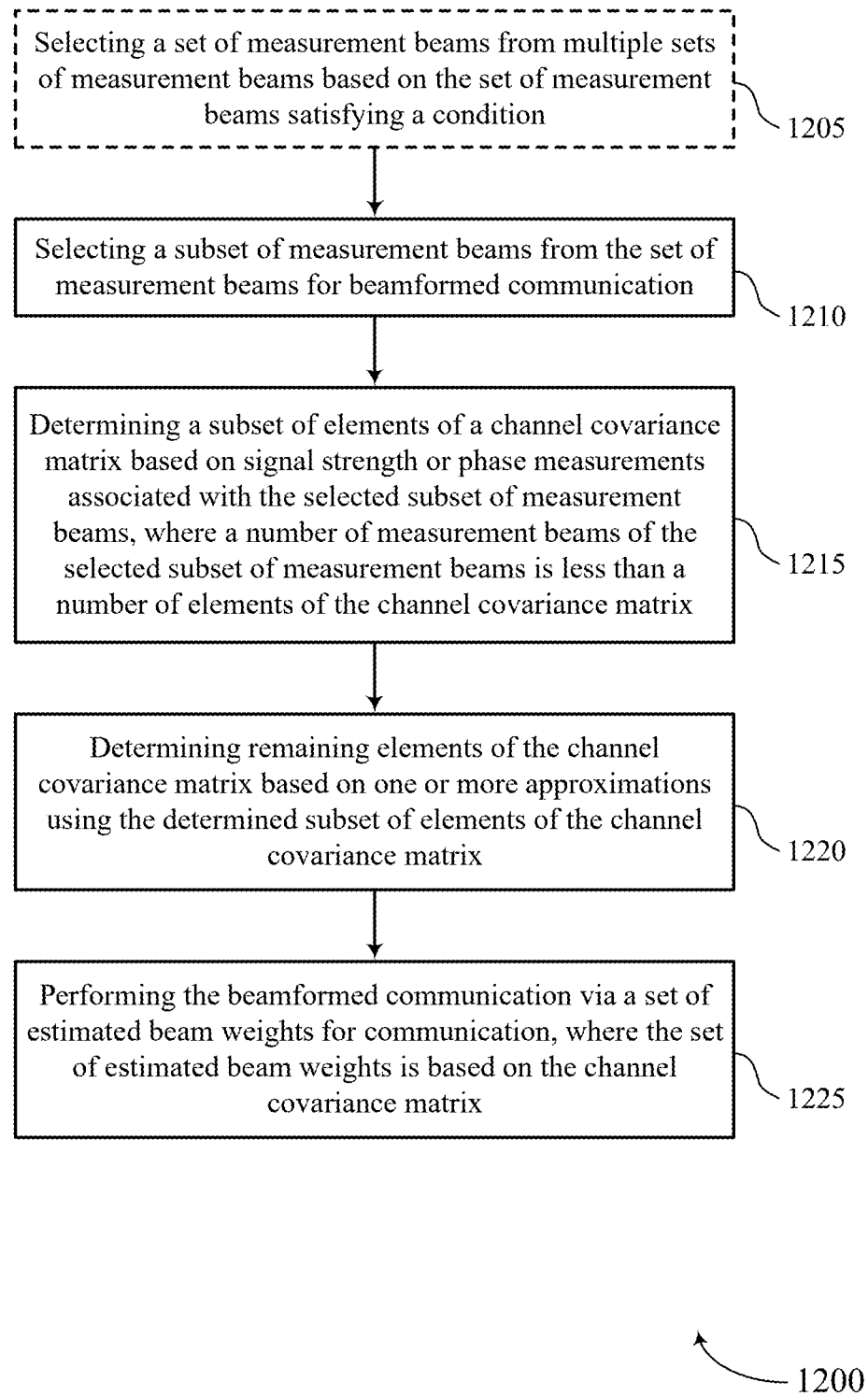

FIG. 12 shows a flowchart illustrating a method 1200 that supports techniques for speedy determination of adaptive beam weights in accordance with various aspects of the present disclosure. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include selecting the set of measurement beams from multiple sets of measurement beams based on the set of measurement beams satisfying a condition. The operations of block 1205 may be performed in accordance with examples as disclosed herein. In some examples, aspects of the operations of 1205 may be performed by a measurement beam selection component 725 (e.g., as shown in FIG. 7).

At 1210, the method may include selecting a subset of measurement beams from the set of measurement beams for beamformed communication. The operations of block 1210 may be performed in accordance with examples as disclosed herein. In some examples, aspects of the operations of 1210 may be performed by a measurement beam selection component 725 (e.g., as shown in FIG. 7).

At 1215, the method may include determining a subset of elements of a channel covariance matrix based on signal strength or phase measurements associated with the selected subset of measurement beams, where a number of measurement beams of the selected subset of measurement beams is less than a number of elements of the channel covariance matrix. The operations of block 1215 may be performed in accordance with examples as disclosed herein. In some examples, aspects of the operations of 1215 may be performed by an element determination component 730 (e.g., as shown in FIG. 7).

At 1220, the method may include determining remaining elements of the channel covariance matrix based on one or more approximations using the determined subset of elements of the channel covariance matrix. The operations of block 1220 may be performed in accordance with examples as disclosed herein. In some examples, aspects of the operations of 1220 may be performed by an element determination component 730 (e.g., as shown in FIG. 7).

At 1225, the method may include performing the beamformed communication via a set of estimated beam weights for communication, where the set of estimated beam weights is based on the channel covariance matrix. The operations of block 1225 may be performed in accordance with examples as disclosed herein. In some examples, aspects of the operations of 1225 may be performed by a beamformed communication component 735 (e.g., as shown in FIG. 7).

The following provides an overview of aspects of the present disclosure:

Aspect 1: A method for wireless communication at a device, comprising: selecting a subset of measurement beams from a set of measurement beams for beamformed communication; determining a subset of elements of a channel covariance matrix based at least in part on signal strength or phase measurements associated with the selected subset of measurement beams, wherein a number of measurement beams of the selected subset of measurement beams is less than a number of elements of the channel covariance matrix; determining remaining elements of the channel covariance matrix based at least in part on one or more approximations using the determined subset of elements of the channel covariance matrix; and performing the beamformed communication via a set of estimated beam weights for communication, wherein the set of estimated beam weights is based at least in part on the channel covariance matrix.

Aspect 2: The method of aspect 1, wherein determining the subset of elements of the channel covariance matrix comprises: determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determining each element of a second number of elements of the subset of elements based at least in part on respective channel measurements associated with a second number of measurement beams of the selected subset of measurement beams, wherein a first one or more elements of the second number of elements are positioned along the same row as an element of the first number of elements, and wherein a second one or more elements of the second number of elements are positioned along the same column as the element.

Aspect 3: The method of aspect 2, further comprising: selecting the element based at least in part on the element having a highest associated signal strength in measurements among the first number of elements.

Aspect 4: The method of aspect 1, wherein determining the subset of elements of the channel covariance matrix comprises: determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determining each element of a second number of elements of the subset of elements based at least in part on respective channel measurements associated with a second number of measurement beams of the selected subset of measurement beams, wherein each element of the second number of elements is positioned along the same row or the same column as an element of the first number of elements.

Aspect 5: The method of aspect 4, further comprising: receiving control signaling comprising an indication of the element; and selecting the element in accordance with the control signaling.

Aspect 6: The method of aspect 4, further comprising: selecting the element in accordance with a rule for covariance matrix element selection.

Aspect 7: The method of aspect 1, wherein determining the subset of elements of the channel covariance matrix comprises: determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determining each element of a second number of elements of the subset of elements based at least in part on respective channel measurements associated with a second number of measurement beams of the selected subset of measurement beams, wherein each element of the second number of elements is positioned along a secondary diagonal of the channel covariance matrix, and wherein the second number of elements is less than the first number of elements.

Aspect 8: The method of any of aspects 1 through 7, further comprising: receiving control signaling comprising an indication of a scheme for determining the subset of elements of the channel covariance matrix using the selected subset of measurement beams, wherein determining the subset of elements of the channel covariance matrix is in accordance with the scheme.

Aspect 9: The method of any of aspects 1 through 8, wherein determining the remaining elements of the channel covariance matrix comprises: determining the remaining elements based at least in part on one or more computations using the determined subset of elements, wherein each element of the determined remaining elements comprises an off-diagonal element of the channel covariance matrix.

Aspect 10: The method of aspect 9, further comprising: obtaining an eigenvector of the channel covariance matrix based at least in part on the determined subset of elements and the determined remaining elements, wherein the obtained eigenvector is associated with an eigenvalue having a highest absolute value among eigenvectors of the channel covariance matrix, and wherein the set of estimated beam weights for communication is based at least in part on the obtained eigenvector.

Aspect 11: The method of any of aspects 9 through 10, wherein the one or more computations are based at least in part on the channel covariance matrix being associated with a single subcarrier, and the beamformed communication is performed via a plurality of subcarriers.

Aspect 12: The method of any of aspects 1 through 8, wherein determining the remaining elements of the channel covariance matrix comprises: setting a respective value of each element of the remaining elements to zero.

Aspect 13: The method of any of aspects 1 through 12, further comprising: selecting the set of measurement beams from a plurality of sets of measurement beams based at least in part on the set of measurement beams satisfying a condition.

Aspect 14: The method of aspect 13, wherein the set of measurement beams satisfying the condition includes a mean squared error associated with the set of measurement beams satisfying a mean squared error condition, an array gain associated with the set of measurement beams satisfying a gain condition, a range of amplitudes associated with the set of measurement beams satisfying an amplitude control threshold, or a number of measurement beams included in the set of measurement beams satisfying a memory threshold associated with storage of the set of measurement beams in a RFIC chip memory.

Aspect 15: The method of any of aspects 13 through 14, further comprising: receiving, from a second device, control signaling comprising an indication of the set of measurement beams, wherein the set of measurement beams is selected in accordance with the control signaling.

Aspect 16: The method of aspect 15, wherein the device comprises a UE and the second device comprises another UE or a network entity.

Aspect 17: The method of any of aspects 13 through 16, further comprising: transmitting, to a second device, control signaling comprising an indication of the set of measurement beams.

Aspect 18: The method of any of aspects 13 through 17, wherein the set of measurement beams is associated with a number of antenna elements, and the set of measurement beams is selected from the plurality of sets of measurement beams based at least in part on the number of antenna elements satisfying a threshold.

Aspect 19: The method of any of aspects 1 through 18, wherein each beam of the selected subset of measurement beams comprises a linear combination of at least one beam of the set of measurement beams.

Aspect 20: A device for wireless communication, comprising one or more memories storing processor-executable code, and one or more processors coupled with the one or more memories and individually or collectively operable to execute the code to cause the device to perform a method of any of aspects 1 through 19.

Aspect 21: A device for wireless communication, comprising at least one means for performing a method of any of aspects 1 through 19.

Aspect 22: A non-transitory computer-readable medium storing code for wireless communication, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a characteristic or performing a function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
    receiving, from a second device, control signaling comprising an indication of a set of measurement beams for beamformed communication in accordance with the set of measurement beams satisfying a condition, the set of measurement beams being one of a plurality of sets of measurement beams;
    selecting a subset of measurement beams from the set of measurement beams, wherein the selected subset of measurement beams is selected in accordance with a number of measurement beams of the selected subset of measurement beams being less than a number of elements of a channel covariance matrix, and wherein the number of measurement beams is less than a total number of measurement beams of the set of measurement beams;
    determining a subset of elements of the channel covariance matrix based at least in part on signal strength or phase measurements associated with the selected subset of measurement beams;
    determining remaining elements of the channel covariance matrix based at least in part on one or more approximations using the determined subset of elements of the channel covariance matrix; and
    performing the beamformed communication via a set of estimated beam weights for communication, wherein the set of estimated beam weights is based at least in part on the channel covariance matrix.

2. The method of claim 1, wherein determining the subset of elements of the channel covariance matrix comprises:
    determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determining each element of a second number of elements of the subset of elements based at least in part on respective channel measurements associated with a second number of measurement beams of the selected subset of measurement beams, wherein a first one or more elements of the second number of elements are positioned along the same row as an element of the first number of elements, and wherein a second one or more elements of the second number of elements are positioned along the same column as of the first number of elements.

3. The method of claim 2, further comprising:
    selecting the element based at least in part on the element having a highest associated signal strength in measurements among the first number of elements.

4. The method of claim 1, wherein determining the subset of elements of the channel covariance matrix comprises:
    determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and
    determining each element of a second number of elements of the subset of elements based at least in part on respective channel measurements associated with a second number of measurement beams of the selected subset of measurement beams, wherein each element of the second number of elements is positioned along the same row or the same column as an element of the first number of elements.

5. The method of claim 4, further comprising:
    receiving control signaling comprising an indication of the element; and
    selecting the element in accordance with the control signaling.

6. The method of claim 4, further comprising:
    selecting the element in accordance with a rule for covariance matrix element selection.

7. The method of claim 1, wherein determining the subset of elements of the channel covariance matrix comprises:
    determining each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determining each element of a second number of elements of the subset of elements based at least in part on respective channel measurements associated with a second number of measurement beams of the selected subset of measurement beams, wherein each element of the second number of elements is positioned along a secondary diagonal of the channel covariance matrix, and wherein the second number of elements is less than the first number of elements.

8. The method of claim 1, further comprising:

receiving control signaling comprising an indication of a scheme for determining the subset of elements of the channel covariance matrix using the selected subset of measurement beams, wherein determining the subset of elements of the channel covariance matrix is in accordance with the scheme.

9. The method of claim 1, wherein determining the remaining elements of the channel covariance matrix comprises:

determining the remaining elements based at least in part on one or more computations using the determined subset of elements, wherein each element of the determined remaining elements comprises an off-diagonal element of the channel covariance matrix.

10. The method of claim 9, further comprising:

obtaining an eigenvector of the channel covariance matrix based at least in part on the determined subset of elements and the determined remaining elements, wherein the obtained eigenvector is associated with an eigenvalue having a highest absolute value among eigenvectors of the channel covariance matrix, and wherein the set of estimated beam weights for communication is based at least in part on the obtained eigenvector.

11. The method of claim 9, wherein the one or more computations are based at least in part on the channel covariance matrix being associated with a single subcarrier, and the beamformed communication is performed via a plurality of subcarriers.

12. The method of claim 1, wherein determining the remaining elements of the channel covariance matrix comprises:

setting a respective value of each element of the remaining elements to zero.

13. The method of claim 1, wherein the set of measurement beams satisfying the condition includes:

a mean squared error associated with the set of measurement beams satisfying a mean squared error condition, an array gain associated with the set of measurement beams satisfying a gain condition, a range of amplitudes associated with the set of measurement beams satisfying an amplitude control threshold, or a number of measurement beams included in the set of measurement beams satisfying a memory threshold associated with storage of the set of measurement beams in a radio frequency integrated circuit (RFIC) chip memory.

14. The method of claim 1, wherein the device comprises a user equipment (UE) and the second device comprises another UE or a network entity.

15. The method of claim 1, further comprising: transmitting, to the second device, control signaling comprising an indication of the set of measurement beams.

16. The method of claim 1, wherein the set of measurement beams is associated with a number of antenna elements, and the set of measurement beams is selected from the plurality of sets of measurement beams based at least in part on the number of antenna elements satisfying a threshold.

17. The method of claim 1, wherein each beam of the selected subset of measurement beams comprises a linear combination of at least one beam of the set of measurement beams.

18. A device, comprising:

one or more memories storing processor-executable code; and one or more processors coupled with the one or more memories and individually or collectively operable to execute the code to cause the device to:

receive, from a second device, control signaling comprising an indication of a set of measurement beams for beamformed communication in accordance with the set of measurement beams satisfying a condition, the set of measurement beams being one of a plurality of sets of measurement beams;

select a subset of measurement beams from the set of measurement beams, wherein the subset of measurement beams is selected in accordance with a number of measurement beams of the selected subset of measurement beams being less than a number of elements of a channel covariance matrix, and wherein the number of measurement beams is less than a total number of measurement beams of the set of measurement beams;

determine a subset of elements of the channel covariance matrix based at least in part on signal strength or phase measurements associated with the selected subset of measurement beams;

determine remaining elements of the channel covariance matrix based at least in part on one or more approximations using the determined subset of elements of the channel covariance matrix; and perform the beamformed communication via a set of estimated beam weights for communication, wherein the set of estimated beam weights is based at least in part on the channel covariance matrix.

19. The device of claim 18, wherein, to determine the subset of elements of the channel covariance matrix, the one or more processors are individually or collectively operable to execute the code to cause the device to:

determine each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and determine each element of a second number of elements of the subset of elements based at least in part on respective channel measurements associated with a second number of measurement beams of the selected subset of measurement beams, wherein a first one or more elements of the second number of elements are positioned along the same row as an element of the first number of elements, and wherein a second one or more elements of the second number of elements are positioned along the same column as the element.

20. The device of claim 18, wherein, to determine the subset of elements of the channel covariance matrix, the one or more processors are individually or collectively operable to execute the code to cause the device to:
determine each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and
determine each element of a second number of elements of the subset of elements based at least in part on respective channel measurements associated with a second number of measurement beams of the selected subset of measurement beams, wherein each element of the second number of elements is positioned along the same row or the same column as an element of the first number of elements.

21. The device of claim 20, wherein the one or more processors are individually or collectively further operable to execute the code to cause the device to:
receive control signaling comprising an indication of the element; and
select the element in accordance with the control signaling.

22. The device of claim 18, wherein, to determine the subset of elements of the channel covariance matrix, the one or more processors are individually or collectively operable to execute the code to cause the device to:
determine each element of a first number of elements of the subset of elements based at least in part on respective channel measurements associated with a first number of measurement beams of the selected subset of measurement beams, wherein each element of the first number of elements is positioned along a primary diagonal of the channel covariance matrix; and
determine each element of a second number of elements of the subset of elements based at least in part on respective channel measurements associated with a second number of measurement beams of the selected subset of measurement beams, wherein each element of the second number of elements is positioned along a secondary diagonal of the channel covariance matrix, and wherein the second number of elements is less than the first number of elements.

23. The device of claim 18, wherein the one or more processors are individually or collectively further operable to execute the code to cause the device to:
receive control signaling comprising an indication of a scheme for determining the subset of elements of the channel covariance matrix using the selected subset of measurement beams, wherein determining the subset of elements of the channel covariance matrix is in accordance with the scheme.

24. The device of claim 18, wherein, to determine the remaining elements of the channel covariance matrix, the one or more processors are individually or collectively operable to execute the code to cause the device to:
set a respective value of each element of the remaining elements to zero.

25. A device for wireless communication, comprising:
means for receiving, from a second device, control signaling comprising an indication of a set of measurement beams for beamformed communication in accordance with the set of measurement beams satisfying a condition, the set of measurement beams being one of a plurality of sets of measurement beams;
means for selecting a subset of measurement beams from the set of measurement beams, wherein the selected subset of measurement beams is selected in accordance with a number of measurement beams of the selected subset of measurement beams being less than a number of elements of a channel covariance matrix, and wherein the number of measurement beams is less than a total number of measurement beams of the set of measurement beams;
means for determining a subset of elements of the channel covariance matrix based at least in part on signal strength or phase measurements associated with the selected subset of measurement beams;
means for determining remaining elements of the channel covariance matrix based at least in part on one or more approximations using the determined subset of elements of the channel covariance matrix; and
means for performing the beamformed communication via a set of estimated beam weights for communication, wherein the set of estimated beam weights is based at least in part on the channel covariance matrix.

26. A non-transitory computer-readable medium storing code for wireless communication, the code comprising instructions executable by one or more processors to:
receive, from a second device, control signaling comprising an indication of a set of measurement beams for beamformed communication in accordance with the set of measurement beams satisfying a condition, the set of measurement beams being one of a plurality of sets of measurement beams;
select a subset of measurement beams from the set of measurement beams, wherein the selected subset of measurement beams is selected in accordance with a number of measurement beams of the selected subset of measurement beams being less than a number of elements of a channel covariance matrix, and wherein the number of measurement beams is less than a total number of measurement beams of the set of measurement beams;
determine a subset of elements of the channel covariance matrix based at least in part on signal strength or phase measurements associated with the selected subset of measurement beams;
determine remaining elements of the channel covariance matrix based at least in part on one or more approximations using the determined subset of elements of the channel covariance matrix; and
perform the beamformed communication via a set of estimated beam weights for communication, wherein the set of estimated beam weights is based at least in part on the channel covariance matrix.

* * * * *